(12) United States Patent
Tsypliaev et al.

(10) Patent No.: US 10,810,357 B1
(45) Date of Patent: Oct. 20, 2020

(54) SYSTEM AND METHOD FOR SELECTION OF MEANINGFUL PAGE ELEMENTS WITH IMPRECISE COORDINATE SELECTION FOR RELEVANT INFORMATION IDENTIFICATION AND BROWSING

(71) Applicant: SlickJump, Inc., Tortola (VG)

(72) Inventors: Maxim V. Tsypliaev, Moscow (RU); Nikita A. Vinokurov, Moscow (RU)

(73) Assignee: Slickjump, Inc., Tortola (VG)

( * ) Notice: Subject to any disclaimer, the term of this patent is extended or adjusted under 35 U.S.C. 154(b) by 96 days.

(21) Appl. No.: 14/514,432

(22) Filed: Oct. 15, 2014

(51) Int. Cl.
*G06F 3/048* (2013.01)
*G06F 40/14* (2020.01)
*G06F 3/0484* (2013.01)
*G06F 16/957* (2019.01)

(52) U.S. Cl.
CPC ............ *G06F 40/14* (2020.01); *G06F 3/0484* (2013.01); *G06F 16/9577* (2019.01)

(58) Field of Classification Search
CPC .. G06F 17/274; G06F 17/277; G06F 17/2785; G06F 17/271; G06F 17/2872; G06F 17/2755; G06F 17/2735; G06F 17/2247; G06F 16/9577; G06F 3/0484; G06F 40/14
See application file for complete search history.

(56) References Cited

U.S. PATENT DOCUMENTS

| | | | | |
|---|---|---|---|---|
| 7,801,876 | B1* | 9/2010 | Riley | G06F 17/30864 707/706 |
| 8,782,516 | B1* | 7/2014 | Dozier | G06F 17/217 715/236 |
| 9,251,141 | B1* | 2/2016 | Gubin | G06F 17/28 |
| 9,747,390 | B2* | 8/2017 | Cooper | G06F 17/30979 |
| 2004/0162729 | A1* | 8/2004 | Strong | G10L 15/1822 704/259 |
| 2004/0167771 | A1* | 8/2004 | Duan | G06F 17/2818 704/10 |
| 2006/0277167 | A1* | 12/2006 | Gross | G06F 17/30864 |
| 2010/0146381 | A1* | 6/2010 | Tsai | G06F 17/30914 715/234 |
| 2011/0320186 | A1* | 12/2011 | Butters | G06F 17/30672 704/9 |

(Continued)

*Primary Examiner* — Stephen S Hong
*Assistant Examiner* — Ahamed I Nazar
(74) *Attorney, Agent, or Firm* — Bardmesser Law Group

(57) ABSTRACT

Method for identifying search candidates, including receiving a content that includes unprocessed content, markup elements and element styles; identifying raw content; applying content styles to the markup elements to determine which sequence of parts of content produces compact logically linked and visually bounded parts of the content; performing syntactic analysis to generate parsing trees; performing morphological analysis to determine parts of speech and word morphology in bounded parts; performing stemming on the parts of speech and constructing chains that meet grammar rules; identifying zests and calculating weights of the zests; applying weights to the chains to determine zests; adjusting the weights based on a distance from a point of user interaction with the content; selecting zests with the highest weight and degree of belonging to a region around the point of interaction; adjusting zests near the point of interaction and using it for selection of information to display.

19 Claims, 21 Drawing Sheets

(56) References Cited

U.S. PATENT DOCUMENTS

| | | | | |
|---|---|---|---|---|
| 2012/0158502 A1* | 6/2012 | Chung | G06Q 30/0255 | 705/14.53 |
| 2012/0197857 A1* | 8/2012 | Huang | G06F 3/0488 | 707/706 |
| 2012/0290288 A1* | 11/2012 | Ait-Mokhtar | G06F 17/271 | 704/9 |
| 2012/0303636 A1* | 11/2012 | Luo | G06F 16/986 | 707/748 |
| 2013/0021346 A1* | 1/2013 | Terman | G09B 5/08 | 345/467 |
| 2013/0041921 A1* | 2/2013 | Cooper | G06F 17/2735 | 707/780 |
| 2013/0085843 A1* | 4/2013 | Dyor | G06F 3/038 | 705/14.49 |
| 2013/0085848 A1* | 4/2013 | Dyor | G06Q 30/02 | 705/14.49 |
| 2013/0085855 A1* | 4/2013 | Dyor | G06F 3/017 | 705/14.55 |
| 2013/0138425 A1* | 5/2013 | Luke | G06F 17/2705 | 704/9 |
| 2013/0151937 A1* | 6/2013 | Weber | G06F 16/9574 | 715/207 |
| 2014/0229179 A1* | 8/2014 | Chotimongkol | G10L 15/1815 | 704/254 |
| 2014/0236579 A1* | 8/2014 | Kurz | G06F 17/28 | 704/9 |
| 2014/0351266 A1* | 11/2014 | Musgrove | G06F 17/2247 | 707/748 |
| 2015/0235130 A1* | 8/2015 | Contreras | G06F 17/30654 | 706/11 |
| 2016/0098383 A1* | 4/2016 | Contreras | G06F 17/30551 | 705/3 |
| 2016/0098394 A1* | 4/2016 | Bruno | G06F 17/271 | 704/9 |
| 2017/0060831 A1* | 3/2017 | Smythe | G06F 17/271 | |
| 2017/0103329 A1* | 4/2017 | Reddy | G06N 5/04 | |

\* cited by examiner

Driven by an *explosion* in photovoltaics, the U.S. solar sector has emerged "from a relatively small contributor to the nation's total electric capacity into a one of comparative significance," the Energy Information Administration reported this week in its latest Electricity Monthly Update.

More than half of that additional capacity has been installed by home and business owners participating in utility net metering programs that allow *owners* of solar systems to sell excess capacity back to their local utility at retail rates, according to EIA.

FIG. 13

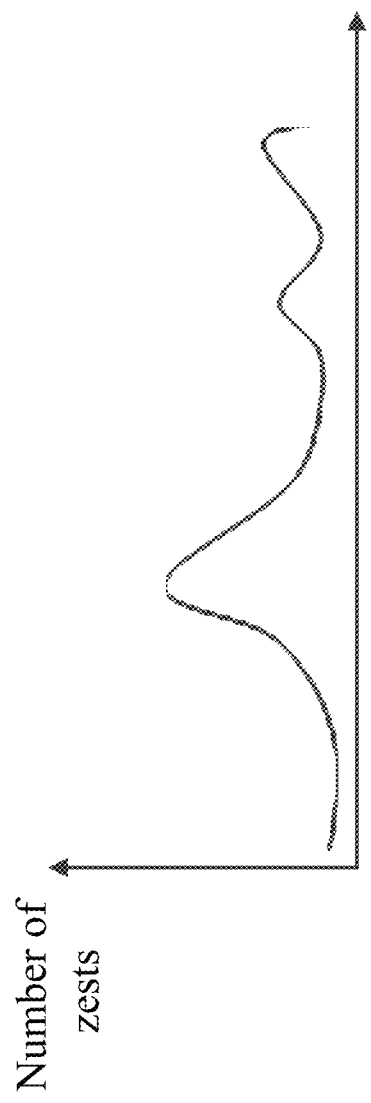

FIG. 14

Neuro-Linguistic Programming (NLP) is an incredibly powerful discipline that enables people to unblock the structures of human communication and human excellence. By doing so people can think, communicate and manage themselves and others, more effectively.
NLP explores the relationships between how we think, how we communicate and our patterns of behaviour and emotion. Patterns will help.
By studying and learning from these relationships people can effectively transform the way they traditionally think and act, adopting new, far more successful models of human excellence.
(This activity is called modelling and is a key feature that distinguishes NLP from psychology).

FIG. 15A

SYSTEM AND METHOD FOR SELECTION OF MEANINGFUL PAGE ELEMENTS WITH IMPRECISE COORDINATE SELECTION FOR RELEVANT INFORMATION IDENTIFICATION AND BROWSING

BACKGROUND OF THE INVENTION

Field of the Invention

The present invention is related to computer and mobile devices, and more particularly, to selection of content based on imprecise user interactions with content displayed on a screen.

Description of the Related Art

Mobile device users typically run special thin applications instead of heavy-footprint conventional browsers that take up a lot of system resources. Thus, mobile users do not use conventional searches nearly as often as PC users. Accordingly, the most popular means of monetization on computer devices are relevant information blocks (such as advertisement, banners, advertisement blocks, links to web pages, text messages, web pages, etc.) and applications integrated into web resources.

The relevant information blocks (relevant data blocks) are small ads that take up portions of a mobile device screen, which is typically quite small. Because the relevant information blocks are also very small, they contain very basic advertisement data (i.e., a short text). These basic ads mostly irritate the users and do not attract attention or spark user interest.

The traditional way of advertising makes each ad different from the other even if the two ads advertise the same type of action, for example a "sale." This advertising approach can be effective for static situations when a customer has plenty of time and is in appropriate mind set to view the ads. However, computer device customers are in on-the-go mode. These customers are not willing to spend a lot of time and energy to recognize that a core meaning of the two different ads is the same—"sale" of different brands of product.

SUMMARY OF THE INVENTION

The present invention provides a method for identifying search candidates in a displayed content, including receiving a content that includes unprocessed content, markup elements and element styles; identifying raw content in the unprocessed content; applying the part of content styles to the markup elements to determine which sequence of part of content produces compact logically linked and visually bounded parts of the content; performing syntactic analysis on the bounded parts to generate a plurality of parsing trees; using a dictionary, performing morphological analysis to determine parts of speech and word morphology in the bounded parts; performing stemming on the parts of speech and constructing chains that meet rules of grammar; identifying zests in the chains and calculating weights of the zests; adjusting the weights based on a distance of the corresponding content parts from a point of user interaction with the content; selecting zests with the highest weight and highest degree of belonging to a region around the point of user interaction; adjusting the zests located near the point of interaction and using the point of interaction as input data for selection of information to display to the user; and displaying the selected information.

The unprocessed content may be received separately as the markup elements and element styles. At least some of the part of content may contain content represented by different geometrical portions of the content. The unprocessed content may represent web page content. Parts of content may be linked logically and geometrically. Parts of the content may include words, phrases, sentences, paragraphs, entire contents of the webpage, advertising, banners, 3D content, video, portions of words, portions of expressions, portions of sentences, portions of images, portions of video. The logical and geometric relationships may include relationships between words, phrases, sentences, paragraphs, entire contents of the webpage, advertising, banners, 3D content, video, portions of words, portions of phrases, portions of sentences, portions of images, portions of video.

The zests may be visible to and selectable by a user. The zests can be used as a query for a search engine for generating search results. The query is modified with data from the collected info-data. The search results based on the query can be presented to a user. The search results are modified as follows before the presentation to the user, and the search results are modified to exclude results based on the preselected options for search: categories, black list of sites, the geographical position; and the search results are modified to include results from other search engines, advertisement services, and items from other applications. The zests can be derived from chains with the highest weights. The calculation of the weights of the zests uses collected info-data. The analysis of the text can also include analysis of images, animation, game elements, advertisements, and 3D models.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention. In the drawings.

Figure 6:
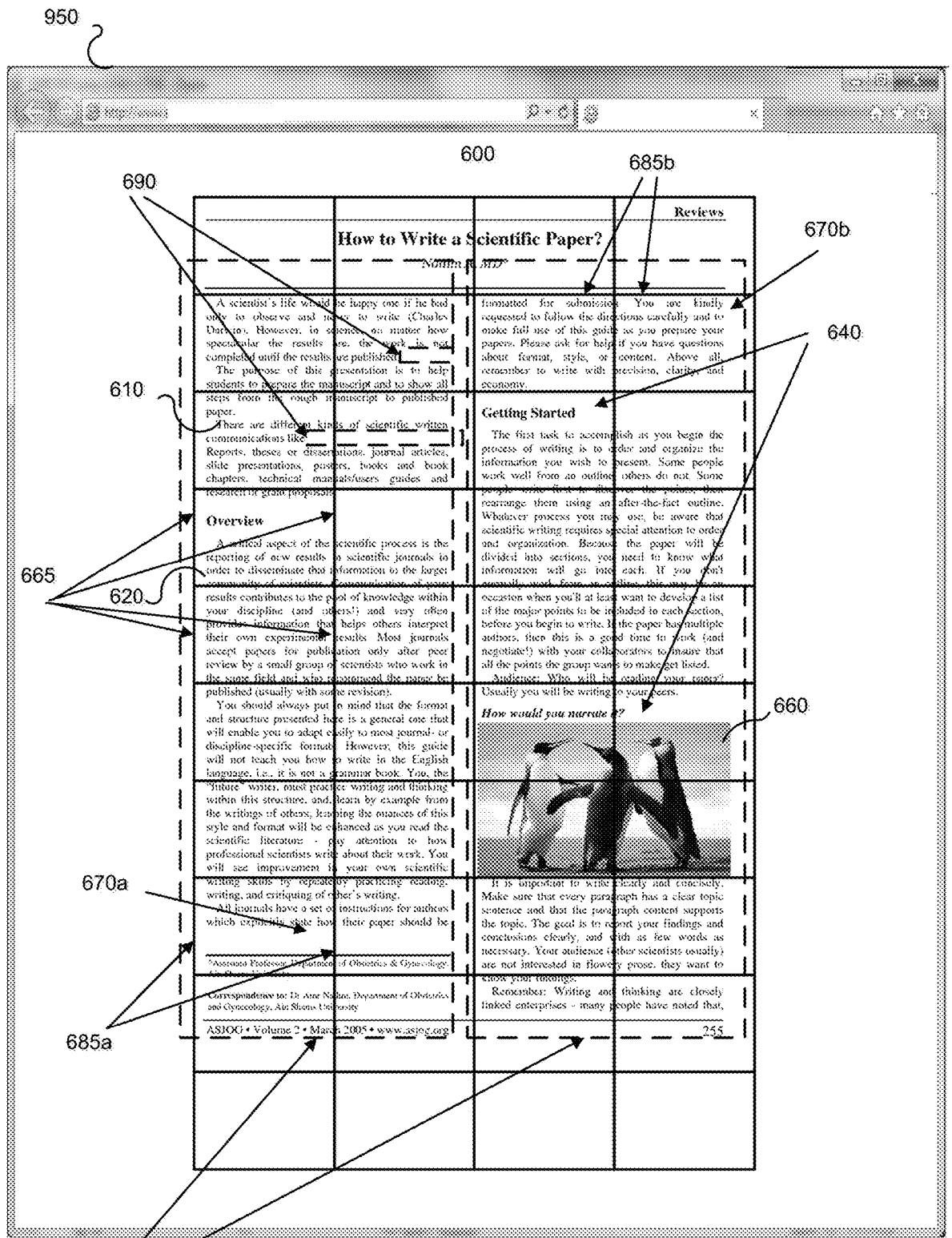
Figure 7:
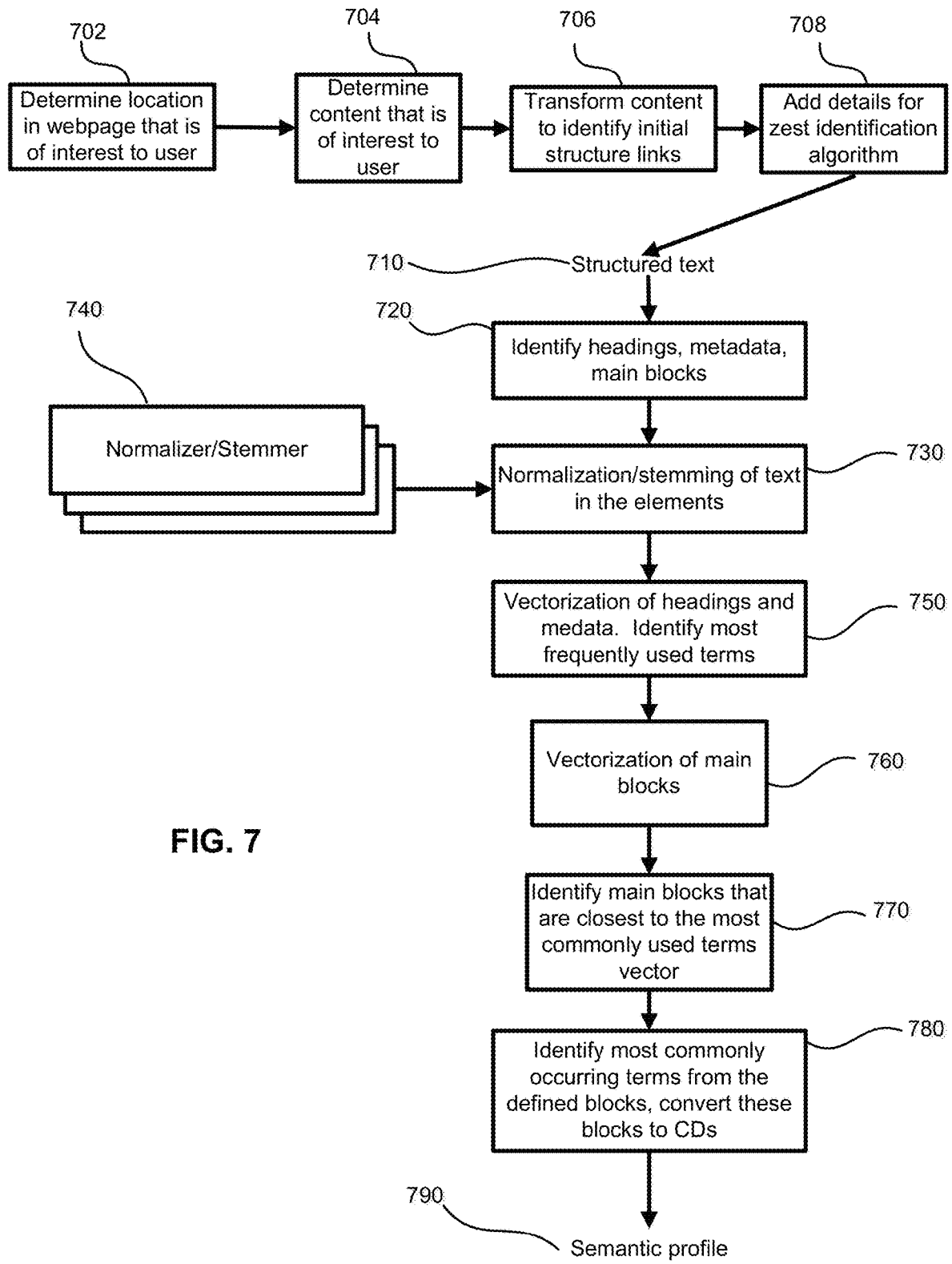
Figure 8:
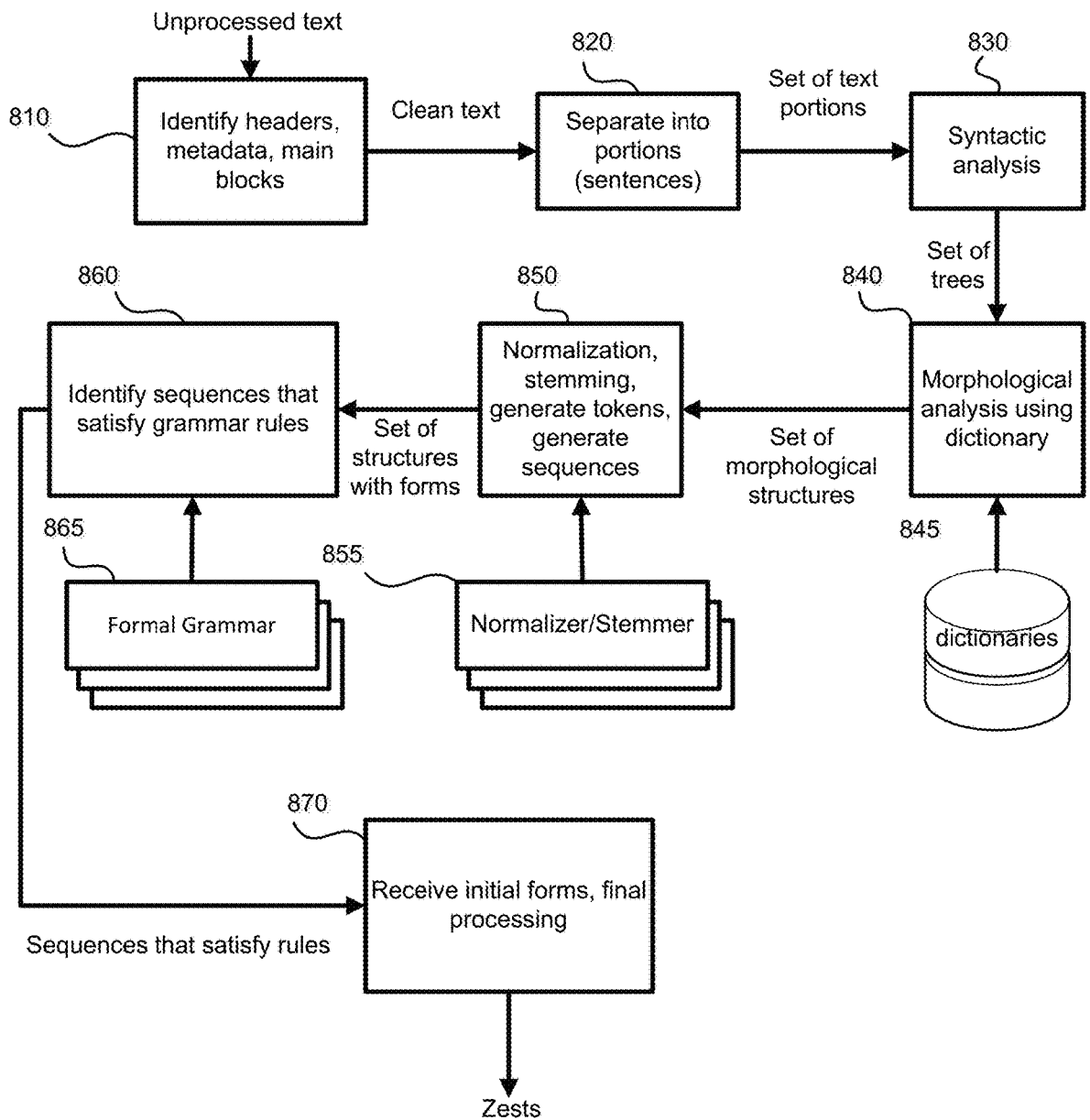
Figure 9:
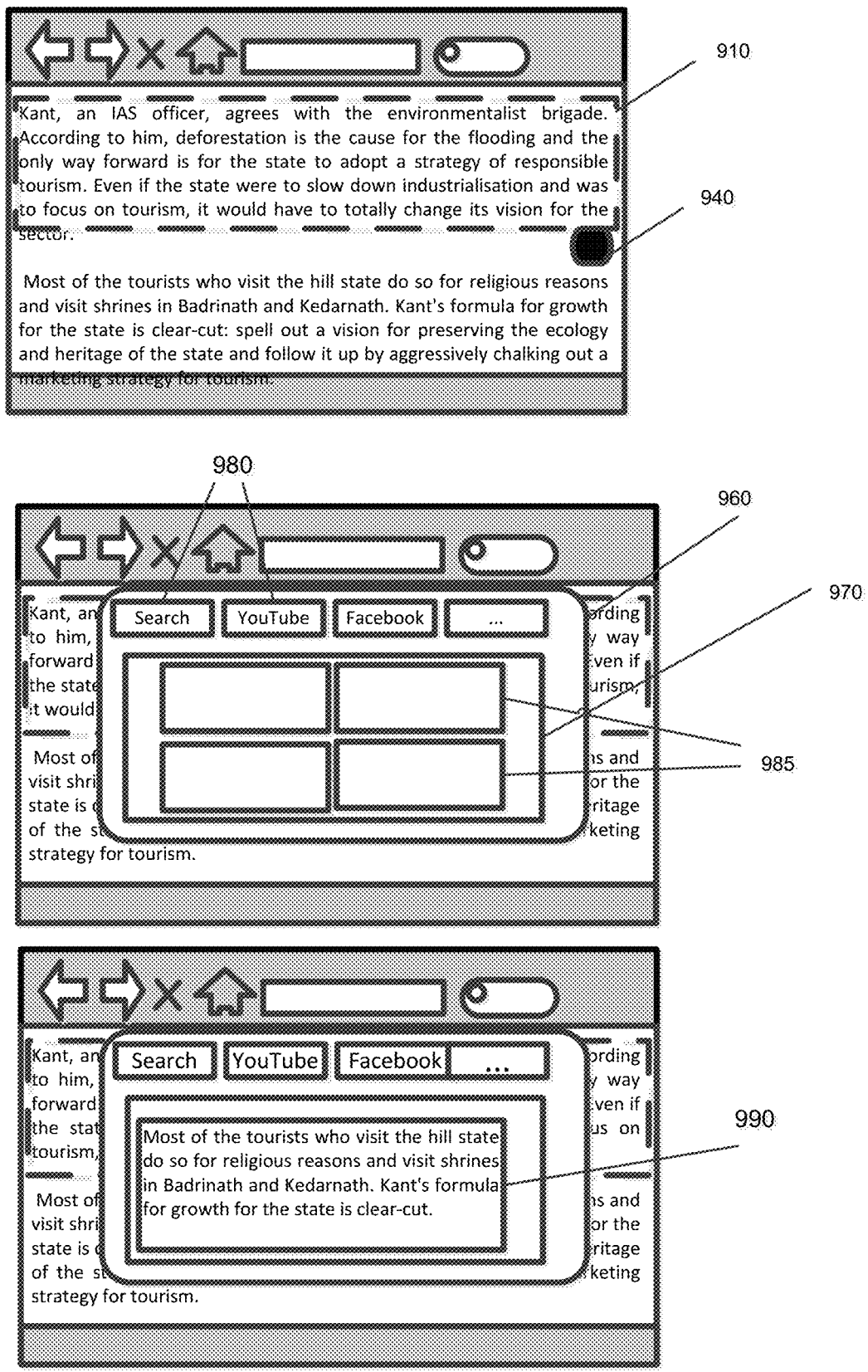
Figure 10:
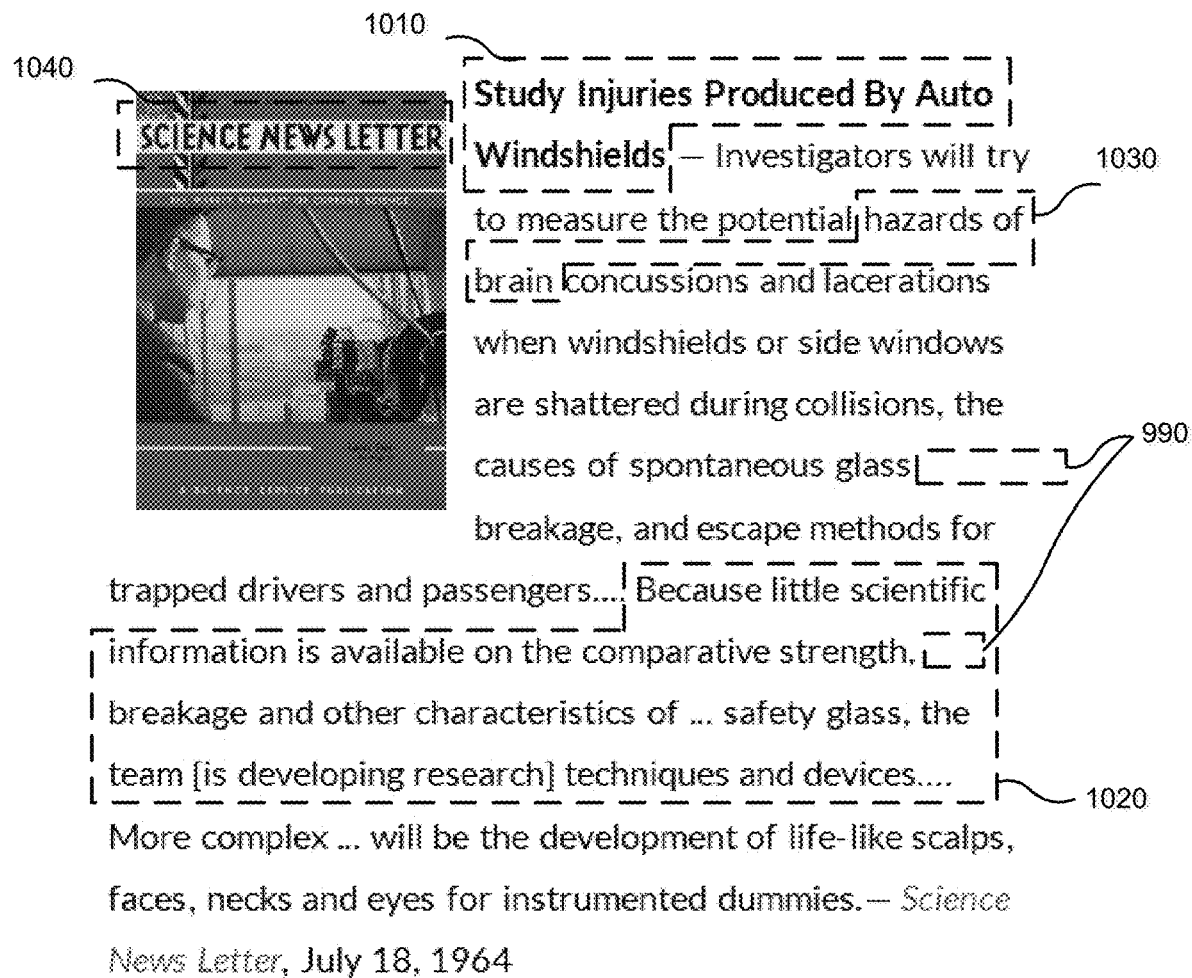
Figure 11:
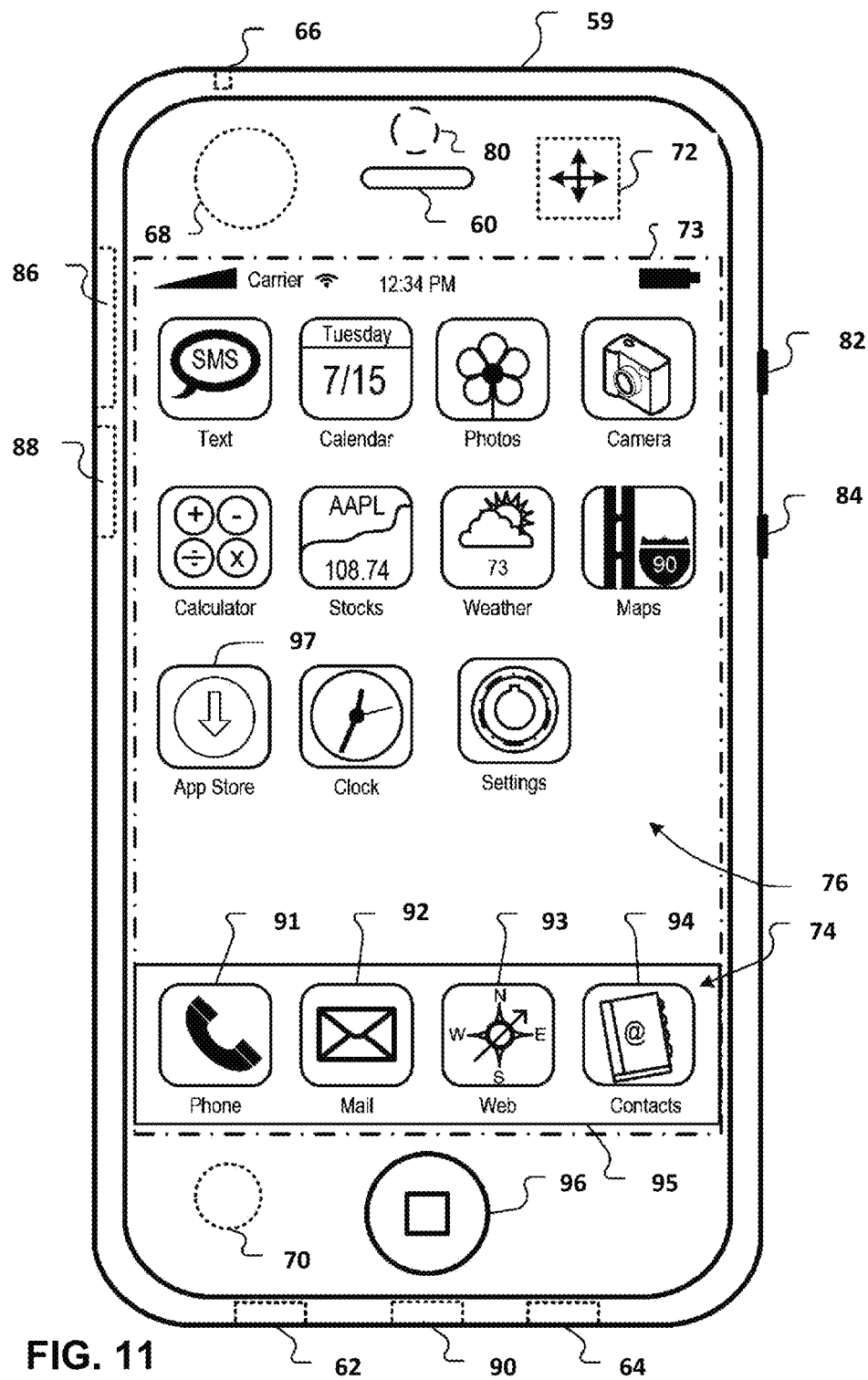
Figure 12:
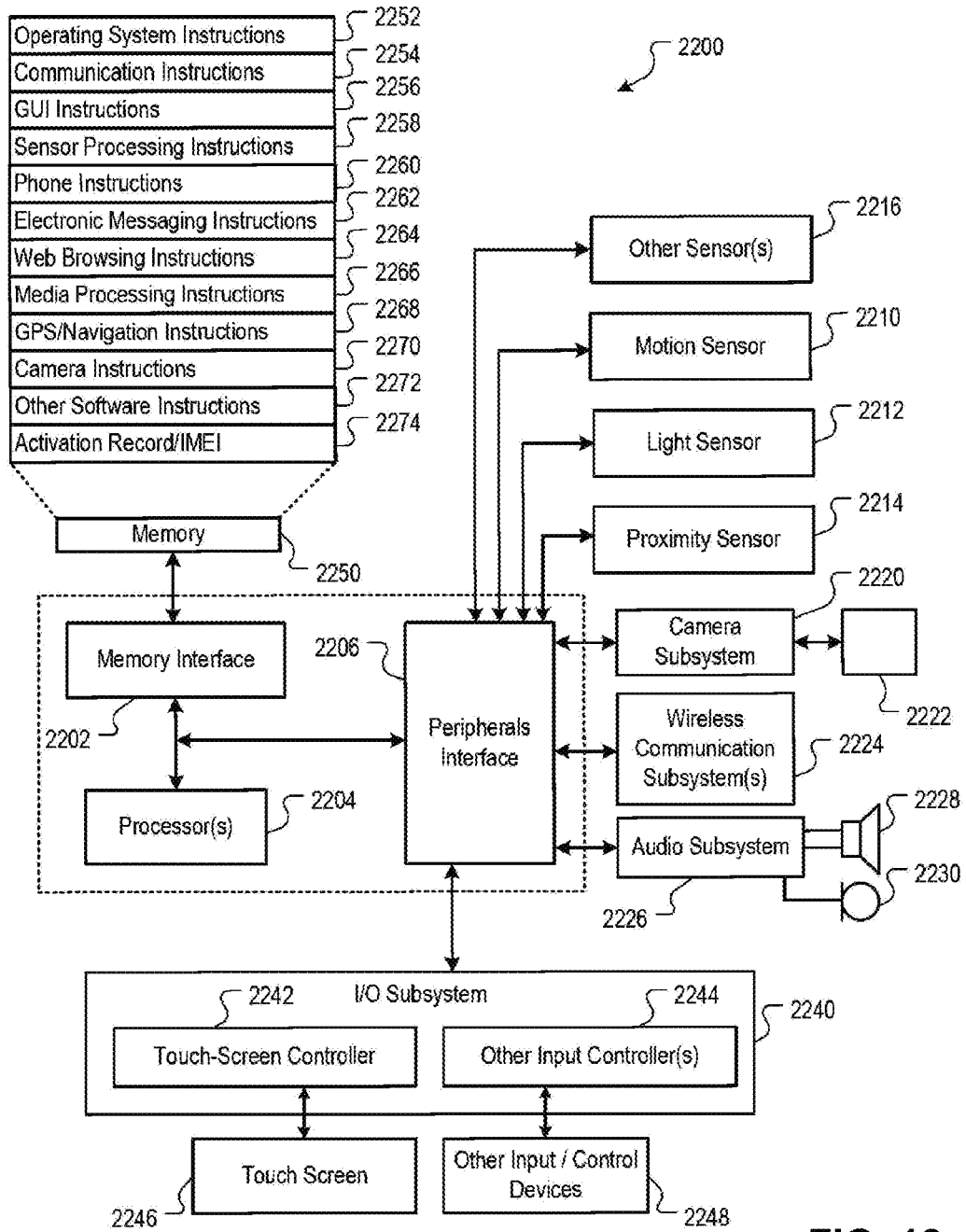

FIG. 6 iilustrates and exemplary analysis of dislayed content elements;

FIG. 7 illustrates a flow chart of a method for semantic text profile construction;

FIG. 8 illustrates a flow chart of the main method of the system for selection of relevant elements (in this example, the elements are words in the text);

FIG. 9 illustrates precise selection of advertisements and graphical presentation of targeted ads to the user;

FIG. 10 shows an example of a logical connection between content elements;

FIG. 11 is a block diagram of an exemplary computer/mobile device that can be used in the invention;

FIG. 12 is a block diagram of an exemplary implementation of the computer/mobile device.

FIG. 13 illustrates an example of relevant/meaningful words and words connected with them;

FIG. 14 is an approximation diagram, where probability density concentration for appearance of featured elements for content from FIG. 13 is shown.

Figure 15B:
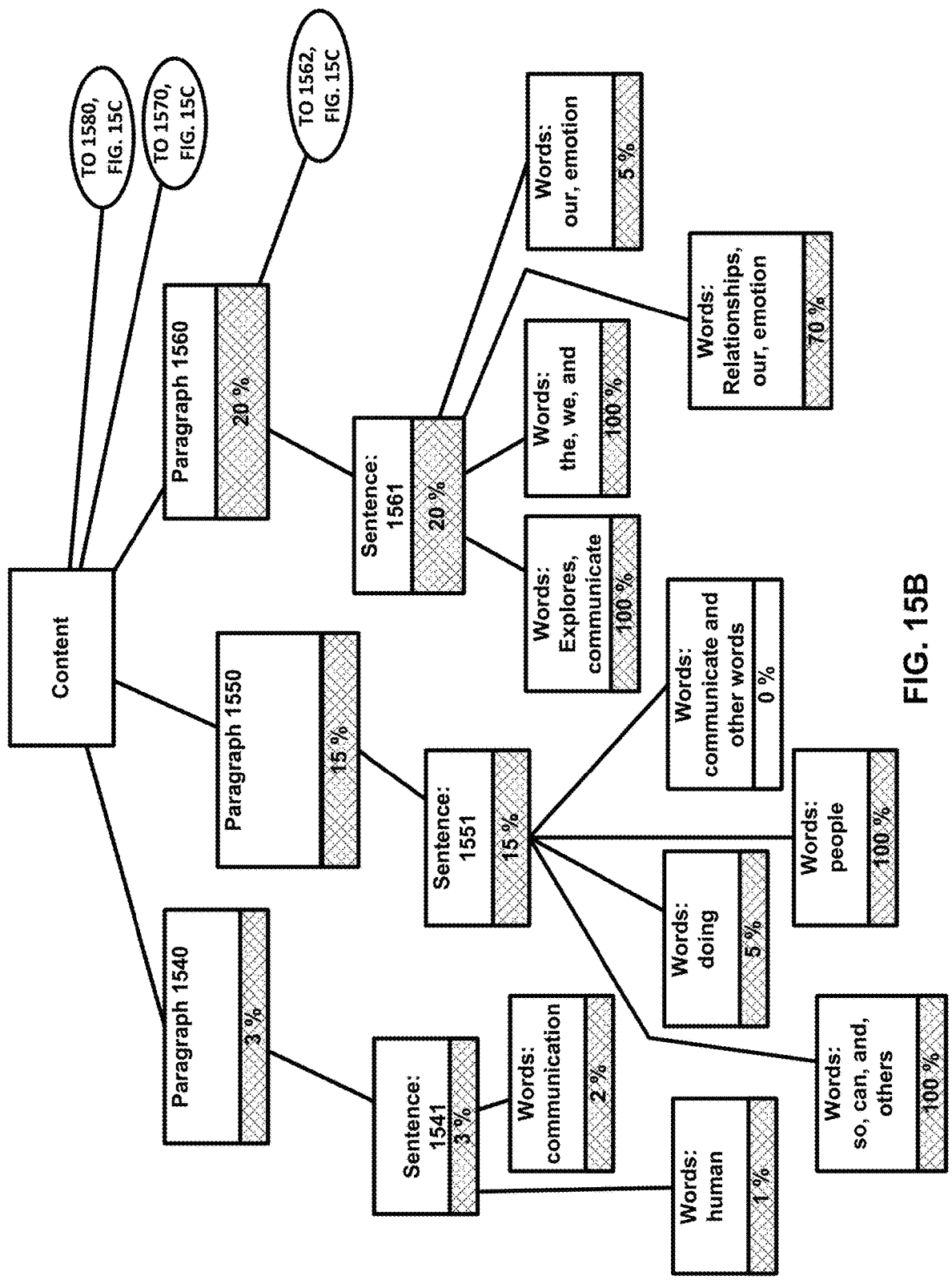
Figure 15C:
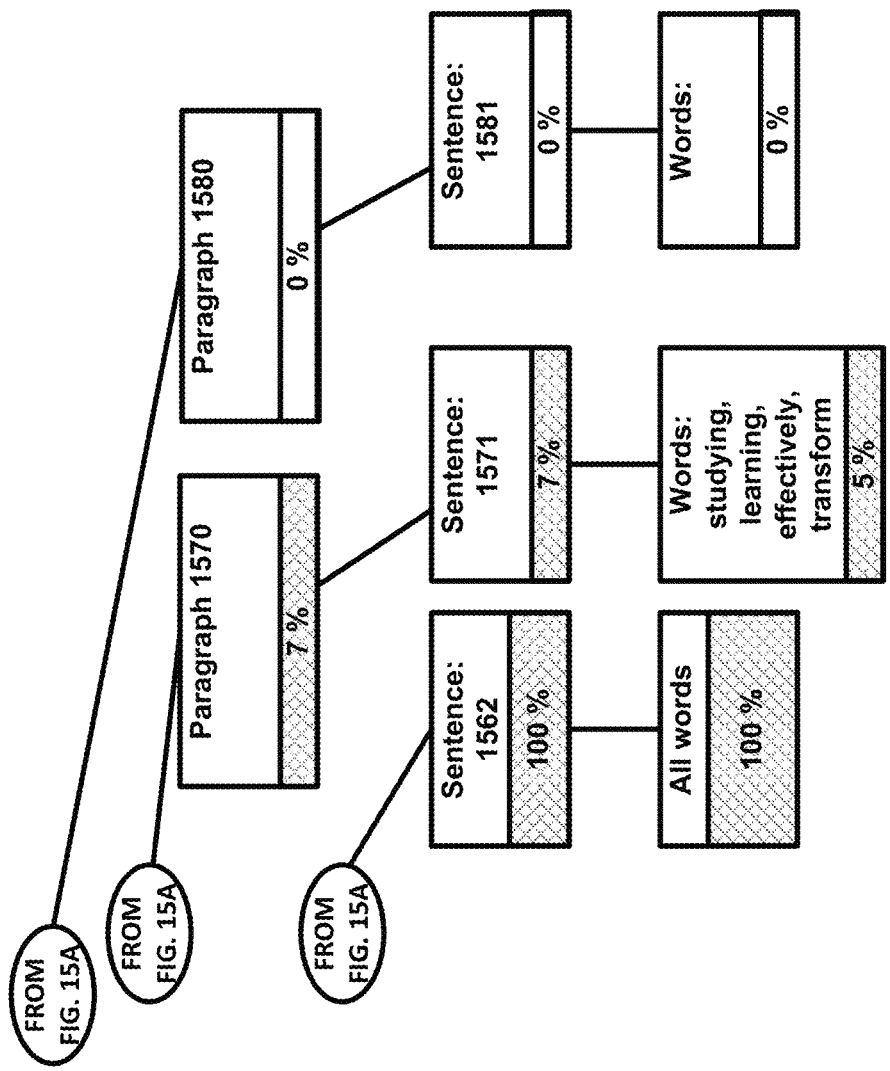

FIGS. 15A-15C illustrate level calculations of element analysis for zest identification;

FIGS. 16-19 illustrate GUI screen shots, in accordance with the exemplary embodiment.

Figure 20:
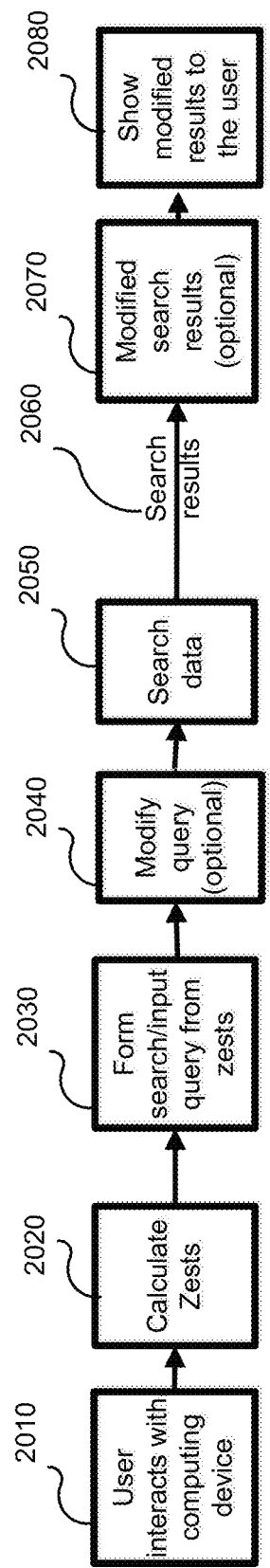

FIG. 20 illustrates another exemplary embodiment of the invention display of information depending on how the user interacts with content on their computing device.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a method and system for.

According to the exemplary embodiment, a system can display one or more relevant information block related to a particular context and fuzzy selected elements of the displayed data for any textual or graphic data displayed to the user. The relevant information blocks can be displayed based on "collected info-data": user geo location, content's context, web-page context, web-page content, user Internet browsing history, media site statistics, web site portion content, page metadata, user's open social profile data (i.e., age, gender, position, interests, friendship), tags associated with the current user provided by third-party services (DMP, DSP), etc., i.e., all data from the available sources via the computing devices. Such information can be collected in the background process from the ad server, publisher server, user computing devise(s), devices and systems (including mail servers, social services, cloud servers/services, web services) connected to user computing device.

Note, that relevant information block can be in a form of additional information in different formats, which can be relevant to a user. For example, image relevant information blocks, can be text blocks, (such as ads, ad banners, advertisement relevant information blocks, links to web pages, highlighted parts of the text), media data, web pages, etc. The relevant information blocks are referred to as ads. However, any relevant information can be rendered to a user.

A list of relevant information blocks is generated automatically based on either web page content or a selected portion of the content (or part of the content) (text, image, portion of the text, part of image, media, entire contents of the webpage, advertising, banners, 3D content, video, portions of words, portions of phrases, portions of sentences, portions of images, portions of video, videostream, part of videostream, audiostream, part of audiostream, 3D models, etc.) and its context. Additionally any combination of targeting parameters can be taken into account for generation of relevant information blocks. A web page context is scanned and an API function calculates content attributes with pre-set parameters that are added for each element of the content structure. Note that the content attributes can be pre-calculated. The API function makes explicit (or implicit) associations of elements with their attributes. The API analyses a given portion of the text and activates control elements that initiate a switch to a relevant information block (s).

The exemplary embodiment, advantageously, uses a narrow content's context explicitly selected by the user. Initially after the user pick the point in the page content (click by the mouse, touch the screen) the some significant parts or the page content will be highlighted to the user for choosing it. The relevant information blocks are displayed based on user interests indicated by a portion of the text or part of content (or a hyperlink and its content) and targeting parameters. In the exemplary embodiment, a relevant surrounding area of a portion of the text selected by the user is referred to as a context. The selected content can be a word or a combination of words (an expression) and the context can include a sentence, paragraph or the entire text (in case of a small text).

According to the exemplary embodiment, the users can notify the system about their interest in a particular part of the content using, for example, an infrared camera, an infrared sensor or a video camera, where the sensor register (Kinect-type integrated or external device) replaces a physical "touch screen" and recognizes user gestures and associates them with the context in the display. Alternatively, the text can be selected by a mouse. In case of using the mouse, the user can select a portion of the context (i.e., a portion of a text or an image) and use a right click on the selected context and select "display of relevant data block" from a menu. The mouse moves and clicks can be implemented using keyboards. Alternatively, a special button of the key board can be used for rendering relevant data blocks. Additionally, the users can use a microphone—e.g., Siri-like model (i.e., a sensor with background voice-recognition module, which can be integrated, external or server-based).

The user indicates a portion of the context and his desire by a voice comment, a kinesthetic detector (i.e., a user uses a joystick), a mouse or wearable sensors (i.e., special gloves), a detector of eye movement (a user can use a device such as Google-glasses or a special camera) that can recognize the portion of the context the user is looking at by the position of the user eyes and the command (e.g., a double-blink) to "activate" this solution. Note that the exemplary embodiment uses only a portion of a text, which is considered as an expression of user interest.

The expression can contain a term, a named entity, or a phrase, which, when augmented with an entire page/paragraph topic, can be used for a narrowed selection. An additional advantage of such an explicit "activation" is that it determines a user who is in "exploration," "curiosity" or "demand" state. Unlike the hyperlinks, any text portion is clickable (i.e., selectable). The click, touch, eye, kinetic or other action performed on the element of the page (i.e., a text, an image, a media content, a portion of the text, portion of an audio/video file) leads to a list of relevant information blocks (pages, links to pages, links to page elements) that fit the content, the context, the particular selection and the user profile and targeting parameters. Thus, the user is shown the most relevant information block.

According to the exemplary embodiment, some elements can be excluded from a preview or they can be replaced by generic images (or icons). Use of icons instead of some less relevant page elements reduces network traffic and load on mobile device. It also improves a speed of rendering the web pages. Almost any activatable (clickable, touchable, etc.) text, takes into the account a nearby context, and leads not to one page, but to a list of relevant information blocks/pages, suitable for the content, context, particular selection and user profile.

According to another exemplary embodiment, an on-demand content-based dynamic advertising is implemented. Any type of a content (e.g., video, audio, text, etc.) has a tendency to invoke or increase desires of people viewing (or listening to) the content. A direct correlation between the content and some desires invoked by the content exists. According to the exemplary embodiment, this correlation is used for targeted advertising.

Any portion of the content (and the corresponding context) that creates certain desires and associations can be used for targeting an ad (relevant information blocks) to a user. However, the main problem is that the elements in the chain Text→Desire →Satisfaction described in terms of word-vectors are not close to each other geometrically. It means that the page or the product descriptions that satisfy a particular desire may not contain words of the original Text and never name or explicitly refer to the desire itself. Thus, some analysis of Text-Desire-Satisfaction associations is needed. Excluding obvious cases, associations between the Text and Satisfaction can be made statistically based on user transactions.

Note that when an advertisement is relevant in terms of user desires and expectations, it is no longer viewed as an advertisement by the user. Instead, the user accepts the targeted advertisement as useful information. According to the exemplary embodiment, a user is given an opportunity to explicitly indicate a portion of the content (e.g., a paragraph within the text or a name of a product) which sparks some interest (or desire). A set of user goals/wishes (elements of content which denote potential user interest) is implemented as a set of attributes of content element (attributes of information block) that is auto-generated for this content. The system determines the most appropriate attributes of content element for a particular user.

According to the exemplary embodiment, the attributes of the content element describes possible user intents with respect to topics disclosed in the content and/or related topics. The attributes of content element can be implemented in a form of a ranked list of keywords, bigrams, topic descriptors, etc. extracted from the context and expanded with synonym and statistically related descriptors. The descriptors are simple text labels that extend a set of known words. For example, the process can be described as following:

the text "SVD—Singular Value Decomposition—is a linear algebra algorithm" after tokenization and stemming is labeled with the following initial list of descriptors:

[kw|svd, kw|singular, kw|value, kw|decomposit, kw|lin, kw|algebra, kw|algorithm, bg|singlar+value, bg|value+decomposit, bg|lin+algebra, bg|algebra+algorithm].

Then, the list goes to the categorization. After category detection (labeling), the list is extended based on category vocabularies with the following labels:

[cat|computer+science, cat|computers+gadgets, cat|education].

After getting particular user-indicated part of the sentence, for example, 'svd', an algorithm can detect (from statistics) that a search with keyword "svd" on a computer-science topic is not transactionable (i.e., does not lead to buying or registration, or anything commercially meaningful). Thus, possible demands associated with these categories (and the context) are limited to "Learn more." So a new label is added to the context descriptors:

[int|learn+more]. Here, kw|, bg|, cat| and int| prefixes denote keyword, bigram, category and intent, correspondingly.

The entire content is analyzed. When the user selects a small portion of the content by clicking on it, the attributes of the content element reflecting this portion is generated and used for targeting the user with the appropriate advertisement. To do this, the system recognizes parts of the sentences, parts of speech, meaning of the words, etc., using NLP (Natural Language Processing) techniques and semantic analysis of the content and its context.

Given that the NLP processing can take significant time depending on a size of the content, the delays can affect usability of the system. The attributes of the content element of the content can be pre-generated and cached, and hashed for subsequent use. Thus, a user is shown highly relevant ads on-demand, where the ads are provided in response to a direct request from a customer (as opposed to a compulsory mode) and the ads are presented as useful recommendations, rather than as direct ads. These ads are more effective than randomly displayed static ads or blinking relevant information blocks. In other words, the user points to a particular portion of the content and explicitly indicates what he wants to see.

This has advantages over conventional Google™ ads that require for a user to switch to Google™ search and enter a search string. This is particularly critical on computer devices (cellphones, laptops, desktops, game consoles, TV-sets, Internet tablets, tablet computers, Ultra-mobile PC, Mobile Internet Devices, E-books, smartphones, etc.), because the search (using Google™ or other facilities) is strongly bound to typing abilities that are quite limited with respect to computer devices. On a desktop the case "Read-→Select→Search Selection" is much simpler than that on computer devices. The exemplary embodiment provides the users with the shortcut: "Read→Indicate→Search."

Note that NLP technology provides for automated analysis of portions of the text selected by a user and for determining the content of the text. The NLP also detects main objects such as an association, a person, a geographical object, amount/volume, money/currency, percentage, company data, etc. The list of objects can be extended by attributes of the content element and targeting data (e.g., time, geo location data, personal preferences, user associations, social network registrations and memberships, gender, language, etc.). According to the exemplary embodiment, the NPL helps the user when the user has difficulties with remembering and typing a search text or with selecting, copying and pasting the desired text, or with selecting the text and starting the search.

According to the exemplary embodiment, the system uses the NLP and "guesses" the parts of the text that can be of interest to the user based on an approximate location within the text. The known techniques of Named Entities Recognition (NER algorithms) can be used along with the statistical analysis of degree of unusualness of words in a part of speech (POS) for a particular paragraph, the text and its category. The unusual words (i.e., the words that spark the user interest in a particular portion of the content) can be grouped by user interests. The unusual words are used as "zest"—points of interests that the system can suggest to the user.

According to one exemplary embodiment, content and associated attributes of the content element can be used instead of a search request based on the explicit user selection. The attributes of the content element is a set of formalized properties derived from a meaning of the content. The attributes of the content element (metadata) are presented in a form of a machine readable language which includes key words, bigrams, n-grams, detected named entities, expected categories, as well as user-defined categories and tags based on frequency distributions. In other words, all possible data that can be used for determining a relevancy of the advertising is employed.

According to the exemplary embodiment, a two component-based targeting (or two-level representation of the request) of advertising is used. The advertisement is targeted to a user based on a combination of the contextual attributes of the content element and selection or explicit indication of words. This novel approach provides advantages over search-based or relevant information block-based advertisements that use either a common topic of the page or an explicit search request.

Those skilled in the art will appreciate that on-demand targeted ads are advantageous for computer devices having a small screen size. The constantly hanging relevant information blocks (ads) take up screen space and require modification of the original content. According to the exemplary embodiment, the context (i.e., an object, such as a sentence or a portion of a sentence, a portion of an image, a paragraph of an article, a video fragment, an image, a 3D model, etc.) indicated by the user is used for advertising instead of a single search term taken out of the context.

Thus, according to the exemplary embodiment, non-relevant ads are eliminated entirely. The ads are displayed on-demand, instead of the relevant information blocks that take up the screen space. The ads are displayed according to a portion of the content explicitly selected by a user. Thus, the ads display only relevant information based on the portion of the content as opposed to some generic ads based on the entire content.

Knowing a set of "wished content" invokes, the ads can be generated and displayed. For example, hotel—booking, reviews; restaurant—menu, reserving a table; product—purchase, reviews, etc. According to the exemplary embodiment, a list of key objects and their categories are auto-generated using Natural Language Processing technology.

For example, if an article discusses a ski resort and a user has clicked on a portion describing one of the resort hotels, there is a high probability that the user wants to know more about this hotel, book a room there or buy lift tickets, etc. However, if the user clicks on new skis, he most likely wants to see some reviews and find out where he can buy or rent them. In order to implement this scenario, the system uses pre-defined association model, which defines a list of possible actions for each type of objects. The association model evolves based on a user feedback (i.e., user actions). The association model can be adjusted based on collected statistics and a market research.

In case when a user-selected portion of the content is complex and contains a multiple potential goals and wishes, the ad rendering process is performed in two steps. In the first step, the system specifies the user wishes. In the second step, the ad is generated based on the data from the first step and rendered to the user. In the first step, the user is given a list (words and pictograms) of possible goals. The user is asked what is of the most interest to him at the moment. Then, the user selects one or more goals. This data is used in the second step, and the ads relevant to the selected user goals are rendered to the user.

According to one exemplary embodiment, an entire computer device screen (or its portion) can be transformed into one active hyperlink instead of a large number of hyperlinks (most of which are not used). This allows for avoiding constantly displayed ads and relevant information blocks that occupy a small screen of a computer device. Furthermore, a user can see an unlimited number of ads, because the relevant information blocks are shown upon request and do not occupy the screen space for a long time.

According to the exemplary embodiment, any textual content can be used for targeted advertisements. The system can render to the users several relevant information blocks based on an associated context. A screen interface of the exemplary embodiment can use controls (panels, edit boxes, buttons, check boxes, etc.) for additional operations. The user can re-define a request by using a list of options. For example, the system can provide a button "I am disappointed" or "Not what I am looking for," which means that the customer is not happy with the ad offered.

Figure 1:
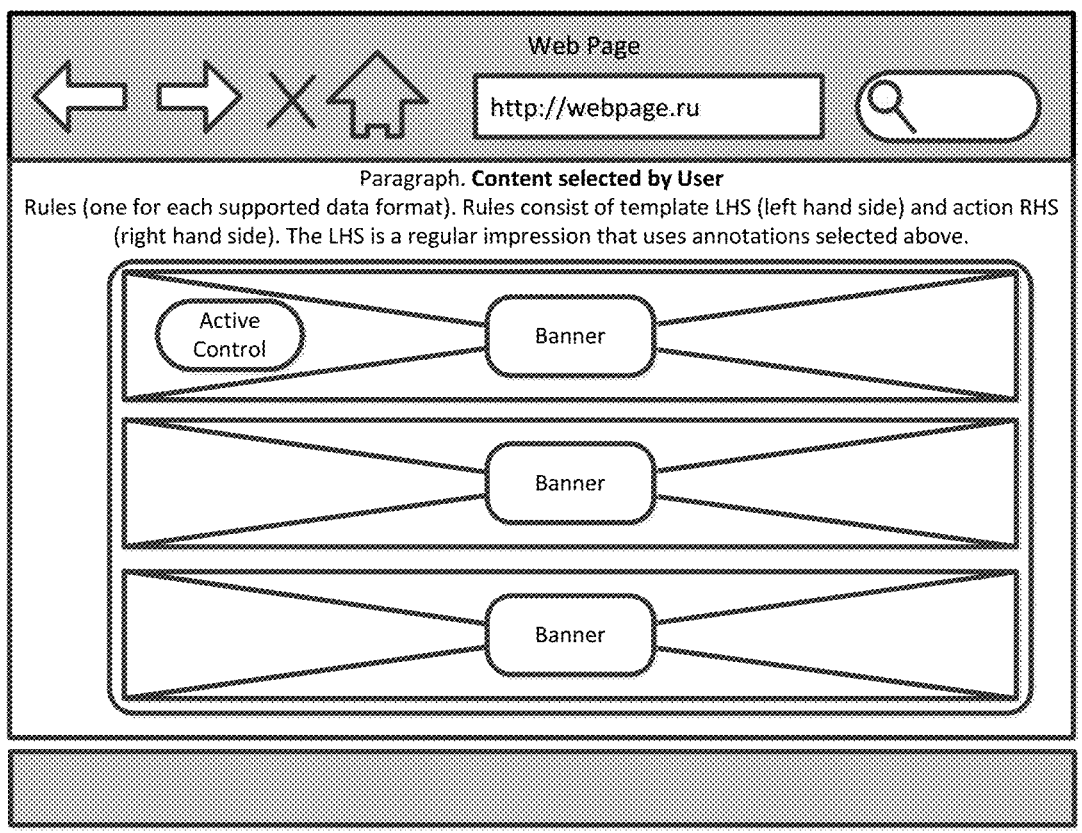
FIG. 1 illustrates displaying of relevant information blocks on computer device, in accordance with the exemplary embodiment.

Also, the system can provide a way to select the ad which is close (or closest) to the customer's need, but does not quite satisfy him. This provides an option for a customer to evaluate the ads directly in-site with the help of buttons "like," "dislike," etc. Then, this information can be used as feedback for advertisers, for ad targeting and customer's rewards. It also provides a "gamification" effect for the customers—e.g., increases customers' engagement with the ads and involve intrinsic motivators, like a sense of autonomy and control. An active control with relevant information blocks is depicted in FIG. 1.

According to the exemplary embodiment, on-demand targeted ads are visible only temporarily, as opposed to the compulsive persistent relevant information blocks. Thus, the ads, advantageously, do not require a "shelf space" and do not destroy the original content. A larger number of ads can be rendered to the user increasing the effects of the advertisement. The ads do not annoy the user (or, at least, annoy the user less than the usual advertisements), because they are generated based on the user preferences. The ads are targeted towards the particular user based on semantic context analysis, optionally without tracking of the user activities. The feedback from the content users is provided.

The users (customers) can click on the portion of the content that somehow stimulates their feelings—this provides additional feedback about the quality of the content. Customers can tell the media resource directly "this is interesting" and "this is not interesting." The history of clicks and the analysis of the "clicked" parts of the content allow for recognition of the patterns, which can help in making the content more attractive to a user. The ad, which receives more than a certain number of negative user feedbacks during a period of time T is automatically excluded from the presentation process, and the advertiser is notified.

According to the exemplary embodiment, several quality-notification thresholds with pre-defined actions for negative and positive feedback are used. The feedback is stored on the server in a form of relations: <ad, timestamp, feedback>. Only the server owner has the direct access to entire data for subsequent analysis. The feedback data is accessible by users in an aggregated form (i.e., a sum, an average, etc.)

The user initiates the feedback process by clicking/tapping on a feedback button. Each button is associated with a relevant information block ID (web-page ID), which is transferred to the feedback server. Each feedback is logged/saved into a database in a form of a record containing:

a relevant information block ID;

a user signature;

a timestamp; and a type of feedback (e.g., like/dislike, not useful, does not match the topic, expensive, complaint, etc.).

The user signature is a hash of user's browser data, which does not contain any personal information. The relevant information block ID is an identifier of an ad message. The timestamp is a current time with accuracy in milliseconds.

According to the exemplary embodiment, each user has access only to:

aggregated records filtered by the user signature and aggregated by the relevant information block ID;

aggregated records not filtered by the relevant information block ID.

Thus, no personal data contained in the feedback of other users is accessible by the user.

Figure 2:
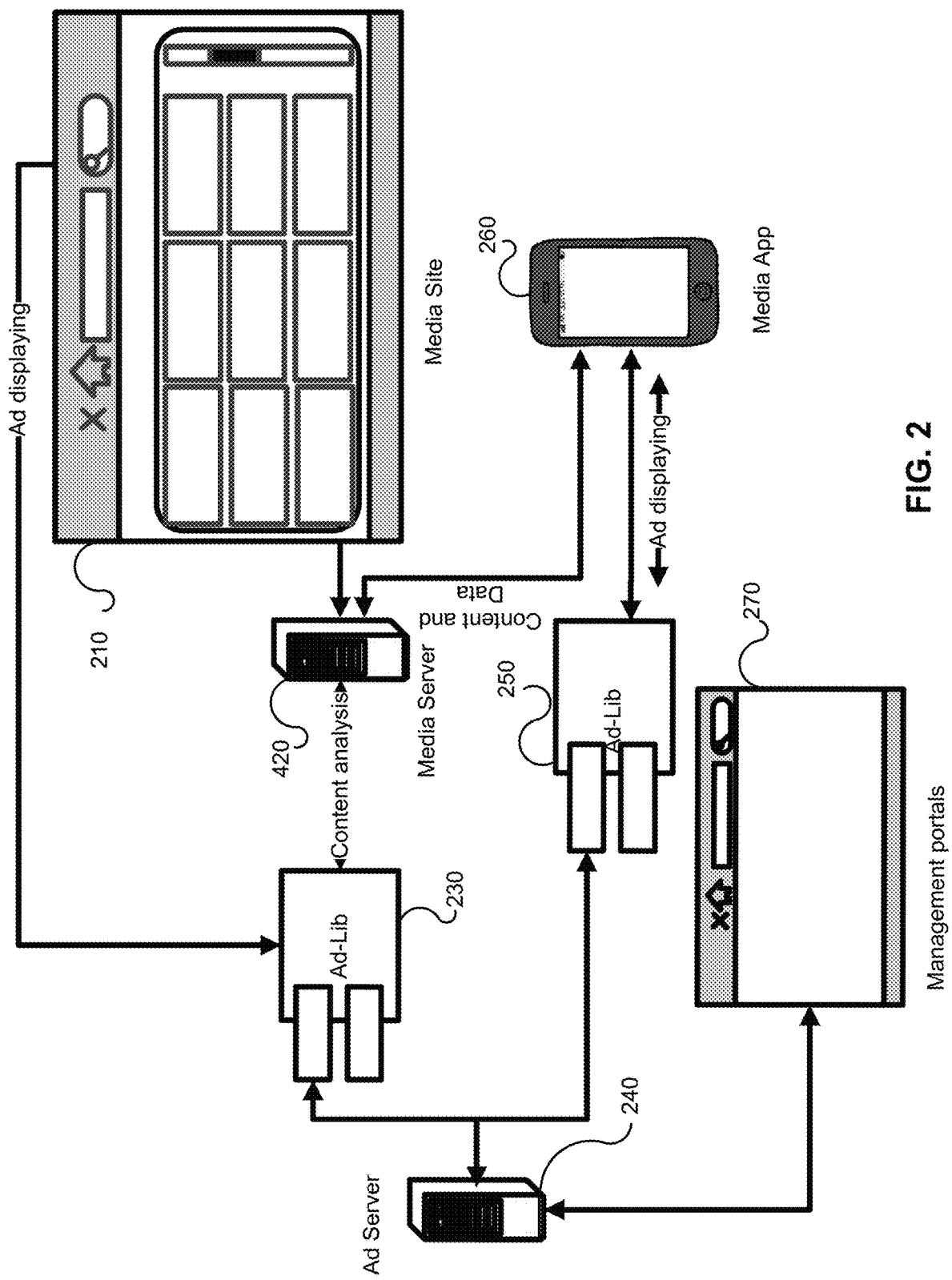
FIG. 2 illustrates a system architecture, in accordance with the exemplary embodiment.

For example, if an object is a new car, the association list can include find a dealer, arrange for a test drive, find a new car loan, etc. Thus, the ad offering these services is generated and rendered to the user. System architecture is illustrated in FIG. 2. The system includes an ad-server 240. The ad-server 240 processes the content, stores and selects ads. Special ads libraries 230 and 250 integrate the ad-server 240 with media resources and applications installed on the computer device.

The ads libraries 230 and 250 render the ads and process user reactions to the ads. For example, a user can click to the relevant information block, ignore it, request re-targeting or express his disappointing with the ads. The ads libraries 230 and 250 are designed to work with computer devices 260 and media sites 210 (sites—a set of web-pages (with scripts, files, links, and etc.) displayed to user by means of web-browser).

According to the exemplary embodiment, the content is stored on a remote media server (third-party server which hosts media source for apps or sites consumed by user) 220 and is provided to the media applications on computer devices 260 or to the media sites 210. A media server is a third-party server, which hosts media sources for applications or sites consumed by a user. A publisher is a person who owns the media source.

The system integration with the media server 220 is implemented by the ads libraries 230 and 250. Content analysis is performed on the media server 220, so the computational load on the clients 210 and 260 is minimal.

According to the exemplary embodiment, the ads are stored on the ad server 240. The ad server 240 is accessed via universal management portals 270 accessible by the computer devices 260 and by the media sites 210. After a user clicks on a portion of the content, the NLP module determines objects within the text, classifies the objects and defines the relations between the objects. As a result, user wishes (desires) are associated with sentences and paragraphs of the text. According to the statistics, up to 80% of the words are used as connecting elements that do not reflect user wishes. Thus, objects that actually trigger the user wishes are rather small in number.

Then, an association model with a matrix is created. The association matrix defines relations between objects and user wishes or desires triggered by these objects. The association matrix also defines boundaries of these relations. In other words, the relations between an object-desire and application constraints for this pair are defined. For example, a gender, a time of a year, public events, etc. are important constraints for people's behavior and desires.

Note that the associations are based on a variety of factors and mainly on a type of the object. For example, a hotel object has one set of associations, a restaurant object has another set of association, and a car object has yet another association set and so on. The association matrix inherits some of the principles from the "interest graph" concept, and extends them with implementing several new options.

For example, Amy Jo Kim's classification of game players behaviors (compete, explore, collaborate, express) can be used to recognize the words in the content, that are associated with each type of behavior (e.g., words "design, create, build" are related with "express" mood) and associate the mood of a user with the services and activities that are suitable for such a mood. A Maslow pyramid can be used for prioritizing the desires for presentation. Also, relationships among services/products ad categories, which are based on statistic distribution (popularity) of classifications in the resources (like Pinterest) can be used. Extrinsic motivators (status, access, power, stuff) and intrinsic motivators (competence, autonomy, relatedness) classification can also be applied to the content and ads classification.

As a result of association, a list of advertisement goals is produced. The association model is formed based on sociological and statistical data. The association model gets constantly updated (taught) in the process of system deployment. Since the content defines and stimulates users' wishes (desires), the content can be analyzed by the NLP only once. Then, a universal model of user wishes can be created by applying the NLP to the association matrix. The ads can be classified according to their relationship to the user's desires, rather than to the classification of the product/services.

In addition to the key words (e.g., brand or product or service name), each object in the content can be associated with several possible activities, which can be performed with the object, i.e., "buy", "booking", "order", "listen", "watch," etc. Also, each object can be associated with some kind of a desire, e.g., "safety," "hunger," "thirst," "curiosity," "love," etc. There can also be key engagement words in the content, e.g., "build," "win," "like," "collect," etc. This can assist in defining the current state of the customer for better targeting of the ads.

Figure 3:
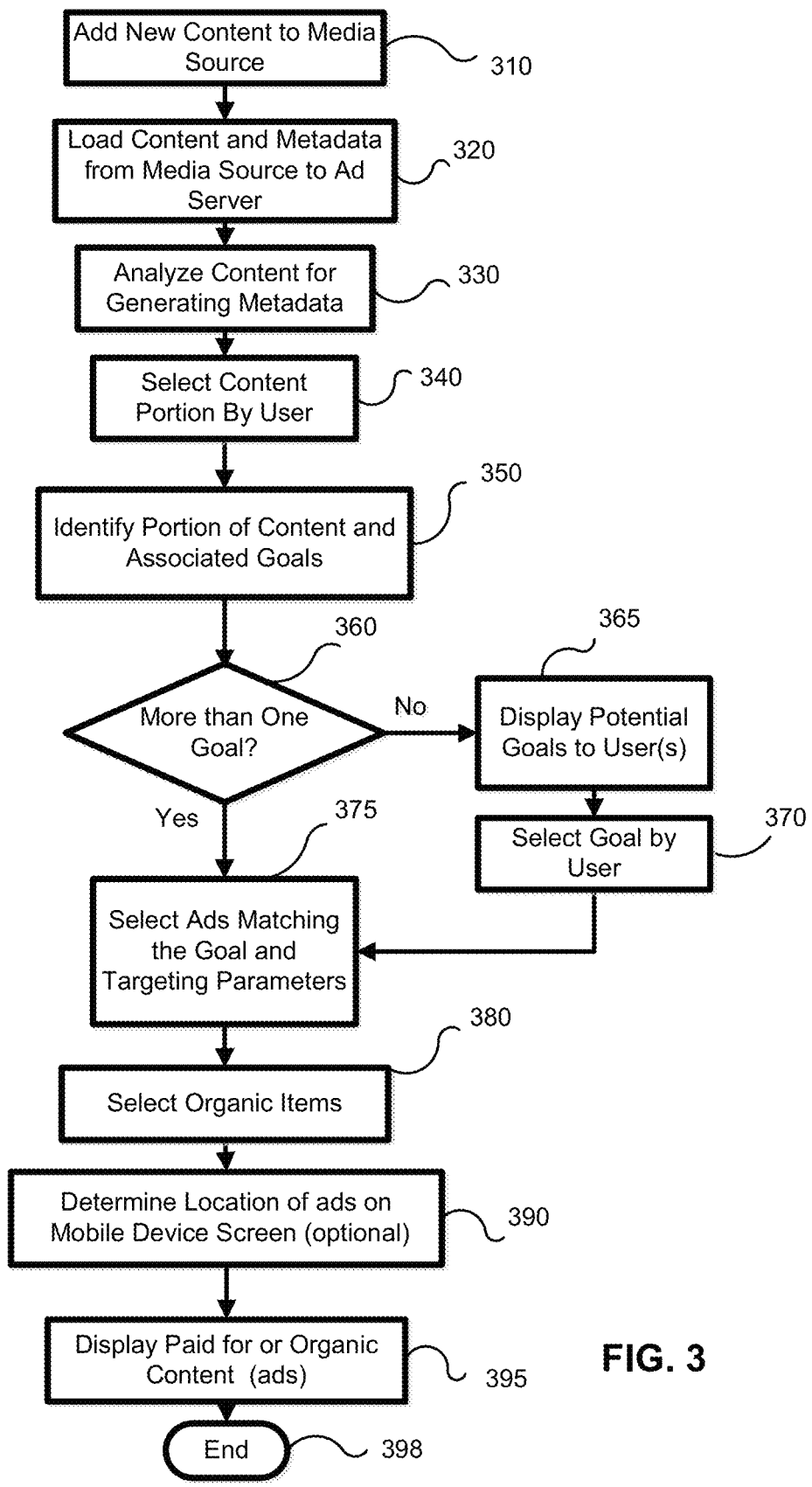
FIG. 3 illustrates a flow chart of a method for precise ad selection, in accordance with the exemplary embodiment.

FIG. 3 illustrates a flow chart of a method for precise ad selection, in accordance with the exemplary embodiment. In step 310 a publisher add new content to a media source. In step 320, the content and a web-page metadata (i.e., web-page parameters displayed to a viewer. HTML tags defining the page metadata are referred to as meta-tags) are loaded from media source to the ad server. In step 330 the content is analyzed in order to determine user goals (wishes) (to generate attributes of content element, CDs). Then, the user selects a portion of the content in step 340, and the portion of the content and an associated goals (i.e., user goals, attributes of content element) are identified in step 350 and the process move on to step 360.

If in step 360 more than one potential user goal is identified, all potential goals are displayed in step 365 so the user can select one of them. Then, the process goes to step 370, where the goal is selected by the user and the process moves to step 375, where the ads matching the goal and targeting parameters are selected. Then, the process goes to step 380, where a free (organic content) is selected. Then, the process moves to step 390, where location on the computer device screen of the paid content and/or organic content is determined. The relevant information block(s) and/or the organic content are rendered in step 395 and the process ends in step 398.

Note that at the initial stage of the process, a portion of the content selected by the user is determined. The system processes user errors caused by an incorrect user finger position on a computer device screen by approximation of the point of touch with several "guessed" points using a random shift [0–X]. According to the exemplary embodiment, a minimal target area is a sentence. If the finger touch affects more than one sentence, the system automatically includes an entire paragraph. If the finger touch occurs between the paragraphs, both neighboring sentences are used for NLP analysis. In case of computer devices with larger screens, a position within a sentence can be used for analysis.

The paragraphs, for example, in HTML format are geometrical objects with known borders. This allows for determining the paragraph within the text indicated by the computer device user. The geometrical borders of sentences or other parts of a text can be calculated as well in order to determine a particular portion of the text selected by the user. For example the text is:

"UCWeb named India as its second headquarters in April. At that time, co-founder and president Xiaopeng He said the company will seek partnerships across domains and verticals in order ti build a thriving ecosystem in the Indian market, where IC Browser first launched in 2011. Having Ma on its board will be helpful as UCWeb works on entering different sectors."

A user interested in knowing more about "UC Browser" can tap on the point near this phrase, but not exactly on it. The application displaying this phrase treats the tap event as bound to the word "where" (before "UC Browser"). The exemplary algorithm helps to find the most probable point of interest. For the exemplary sentence, the "zest" words are: "Xiaopeng" (probably, named entity), "Indian market," "thriving ecosystem" and "UC Browser." Thus, the user can refine his search with "UC Browser" easily only by selection of the term from the list of suggestions.

According to the exemplary embodiment, the media resources are used for precise targeting of the advertisements. The exemplary embodiment uses resource catalog which indicates the content and user history on the resource. For example, certain catalogs used for targeted advertising attract particular audience—e.g., "financial markets," "banking news," "travel," "technical news," "business schools," "small business," "development," "gardening," "real estate," "cars," etc. each have their own audience. The user history collected on the ad server can be used for extending/specifying in more detail a user profile. However, the user history only serves as additional (optional) information.

Figure 4:
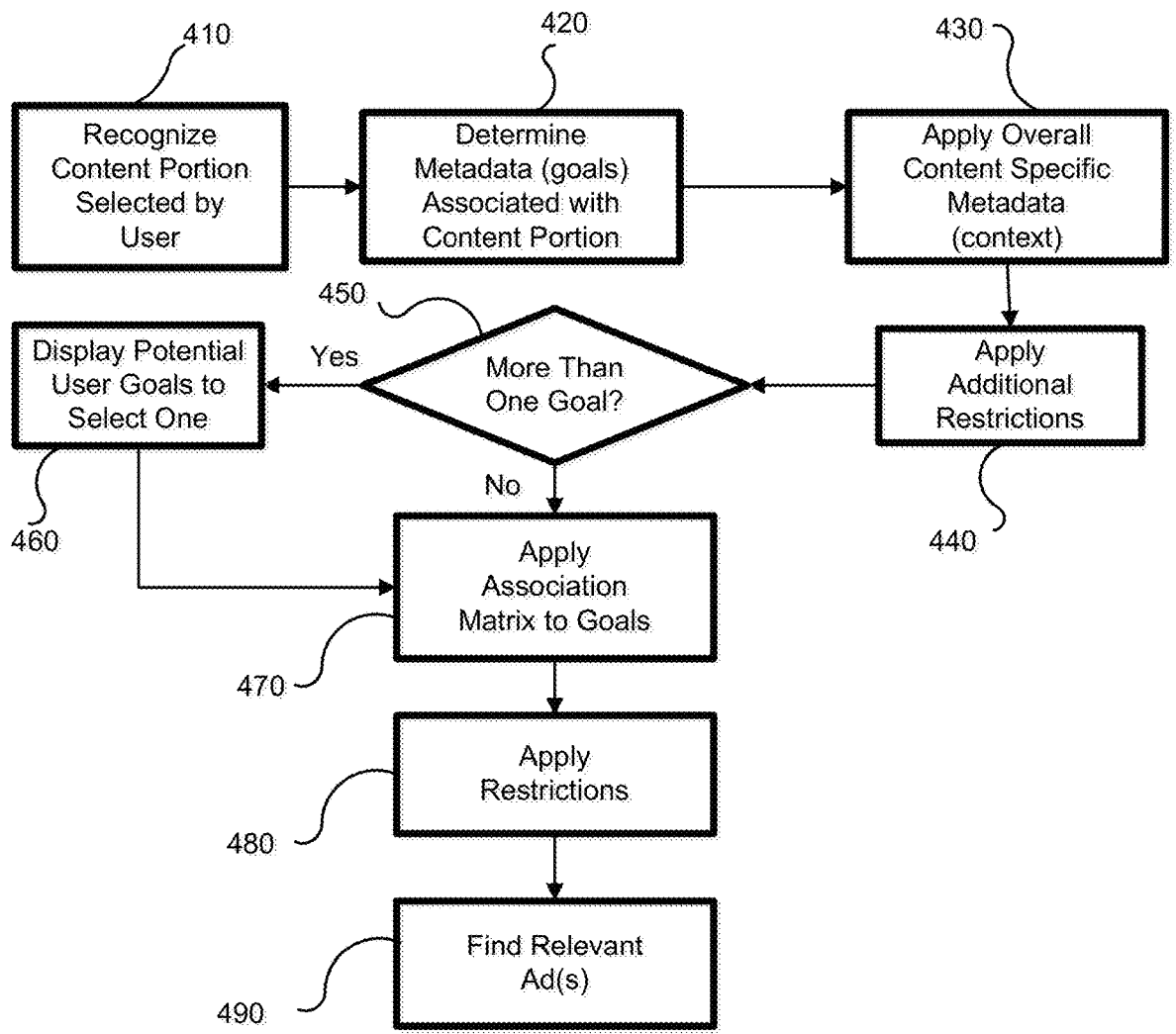
FIG. 4 illustrates a flow chart of a method for precise selection of the advertisements, in accordance with the exemplary embodiment.

FIG. 4 illustrates a flow chart of a method for precise selection of the advertisements, in accordance with the exemplary embodiment. In step 410, a portion of the content selected by the user is recognized. A metadata (goals) associated with the selected portion of the content is determined in step 420. Then, the overall content metadata is applied in step 430. This metadata is a metadata of the context of the content, in other words, a metadata is an additional data, which describes the content (keywords, categories, titles, etc, references).

In step 440, the additional restrictions (gender, site, device type, geo location, language, age, gender, etc.) are applied. If more than one potential user goals are detected in step 450, the possible goals are displayed to the user for selection of one in step 460, and the process moves to step 470. Otherwise, the association model (matrix) is applied to the goal in step 470. Subsequently, the restrictions (geolocation data, gender, time zone, user device type, website, etc.) are applied to the user goal in step 480. Then, the most relevant ad(s) is found in step 490.

For example, when a person has clicked on a sentence with a description of a restaurant and a music group that is playing in that restaurant that night, in the first step the algorithm has to select between "meal" and "music," and after the customer selects "meal" category and it turns out that the restaurant has a different geographic location than the user (for example, the user is in the US and the restaurant is in France), there is no need to offer that person a booking of a table in that restaurant, but rather it would make more sense to offer him a local restaurant with the same type of cuisine.

For example, the content can be related to cars, but the context can include "buying," "repairs," 'trade," and "sale" categories. The system takes into consideration a user history of visited sites, computer device OS type, computer device model, user financial status, user preferences. The system also takes into consideration the metadata of a current page or metadata of the visited pages, the user search requests, mail messages and social network messages and comments.

According to one exemplary embodiment, the relevant ads can be selected based on key words and a place on the page currently viewed by the user. The context is a hierarchy of a group of words or topics relevant to the content (text) located around the selected word, sentence, paragraph or portion of text. In the exemplary embodiment, the context is analyzed and the relevant ad(s) is shown based on the weight of the text and the metadata including additional information for the targeting of the ads. Note that the entire text is used a meta-link. The ads are formed on the ad server and displayed without changes in the original structure of the pages. The area selected by the user is highlighted as a hyperlink.

According to the exemplary embodiment, the ads that are no longer paid for are not shown. The tracking of the paid ads is performed on the ad server, which sends the notifications. The paid content is stored as a set of records that have data on:

displays (over a campaign, month, day);
user visits after clicking on the relevant information block (over a campaign, month, day);
transactions (sale, call, SMS, etc.);
calculated price of the ad display, switch to the site, transaction (over a campaign, month, day);
maximum and minimum numbers of the ad display, switch to the site, transaction (over a campaign, month, day);
maximum and minimum prices of the ad display, switch to the site, transaction (over a campaign, month, day);
aggregated price limit;
aggregated time limit.

According to the exemplary embodiment, the advertiser accounts are incremented and compared against the limits and the relevant information block is marked inactive and is no longer displayed, if the limit is reached. If the account balance is increased, the relevant information block is displayed again. According to the exemplary embodiment, the content is a meta-link. The user can get to the linked page by touch, gesture, eye movement, voice, etc. A click is performed as a special gesture: swipe left or right on paragraph for shifting between the paragraphs. The link is dynamically built based on results of semantic analysis.

The context of a given textual expression (which can consists of one word) in a given text document is a textual element that includes the expression and surrounding text. The range of surrounding is defined by the context level that can take a value from a sentence part, a sentence, a paragraph, an article, a domain set, etc. A certain-level element of the content C is considered meaningful if the set of its meanings A, produced by a function M: A=M(C) is not empty, where M is a Meanings Mapping. The Meanings Mapping is an approximation of a function, defined on the domain of Content structure, and having its range in a limited set of sets of reader's reactions or intents (curiosity, learn more, willing to have, etc).

The Meanings Mapping shows potential reader's interest, which can be triggered by encountering certain parts of the text. The context level is defined for a particular-level textual expression. Proposition: to distinguish the next expression levels, from small elements to a biggest one: Word, Group of words, Sentence component, (sequence of words between commas, etc.), Sentence, Group of sentences, Paragraph. The next context levels for Word: Group of words, Sentence component, Sentence, Group of sentences, Paragraph, Group of paragraphs, Article, Group of articles, Theme section, Domain. For Group of words: Sentence component, Sentence, Group of sentences, Paragraph etc.

An algorithm for extracting keywords can be used in this implementation of the invention as follows:

Input: textual element E, quantile q

Output: S-list of keywords/bigrams in CD (Context Descriptor) form

A special form is used to describe keywords as CDs. A simple CD is a pair: (CD_type, CD_value), where CD_type takes value from {keyword, bigram, . . . } and CD_value is a normalized (stemmed, lemmed, "lowercased") word or bigram.

1. Extract all textual expressions that satisfies the next patterns:

<arcticle>[adjective]{noun/number}[verb]
[adjective]{noun/number}[verb]
. . .

Denotations:

<.>—exactly one element

{.}—one or more elements

[.]—zero or more elements

Append all these expressions into R multi-set.

2. Remove stop-words (if they are part of the pattern) from expressions. The stop-words are the words of the language which are considered low-informative, garbage or noisy such as articles, propositions, etc.

3. Calculate frequency of words and bigrams included into expressions.

4. Construct a distribution. Sort words and bigrams by this distribution. Choose words and bigrams with maximal frequency, using given quantile q.

Add these words and bigrams into returned set S. Only Meaningful Content is analyzed. An usefulness algorithm can be used as follows:

Input: Web-page P, quantiles q1, q2

Output: Set of meaningful elements M

1. Consider given web-page as a set of HTML headers+ HTML elements, P={h1, . . . , hN, e1, . . . , eM} and Meta information (Meta description+meta content) M={m1, . . . , mK}.

2. Remove elements with low value of text length and elements with large value of relative links concentration from P.

3. Make stemming of words in P and M, delete stop-words.

4. Multiset of meaningful elements S={ }

5. Make text vectorizer based on meta information m1, . . . , mK', V[m1, . . . , mK'](x) —vector—function. It shows how many words from {m1, . . . , mK'} are contained in textual element x.

6. Add into S such elements e from P that satisfies condition sum(V[m1, . . . , mK'](e))/len(V[m1, . . . , mK']) >=q1, where sum(V[m1, . . . , mK'](e)) is a sum of vector elements, len(V[m1, . . . , mK'])–length of a vector (that is an equivalent for "a number of function arguments").

7. Find such headers h1, . . . , hL that:

h: Sum(V[h](x))->max x from P, where max is the vector of the maximal length.

Call it base headers. Make vectorizer V[h1, . . . , hL](x)

8. Append to S such elements e from P: sum(V[h1, . . . , hL](e))/len(V[h1, . . . , hL]) >=q2.

9. Append to S elements that satisfies some geometrical conditions. For example, if base headers set is {hi}, add to S elements that are situated below this header to the next header on the web page.

10. Meaningful elements set M=Unique elements of S.

Semantics analysis is performed when content is being published in real time or when crawling. No additional software for the user is required (everything works in a browser like regular links). All computations are performing on a server-side. The server side consists of the following services:

ContentSemanticServer—responsible for pre-processing units of the Content and storing them in a computer-readable format;

AdFeatureServer—responsible for pre-processing resulting texts and storing them in a computer-readable format;

TargetingServer—responsible for analyzing reader's queries on the content and performing search of matching results, most relevant with respect to reader's intent.

The results types can be used in the exemplary embodiment: Promoted Result, Got from Advertisers, Is pushed, Always actual, the organic Content is displayed when there is no relevant marketed content.

The exemplary organic Results are: Object Reviews, Opinions from Forums (trusted adviser mechanisms), Geographical Points, Price and Selling Info, Similar items. Depending on detected categories organic results can be processed from GOOGLE, WIKIPEDIA, ETSY, etc. The organic or Promoted Results can be stratified by user's intent they aim to serve with respect to the content part: Learn more about, Curious what it is, What's new on this, What people say on this, Where can I get it, How much does it cost, Want to buy it. Note that the organic and Promoted Results are shown at the same time.

Figure 5:
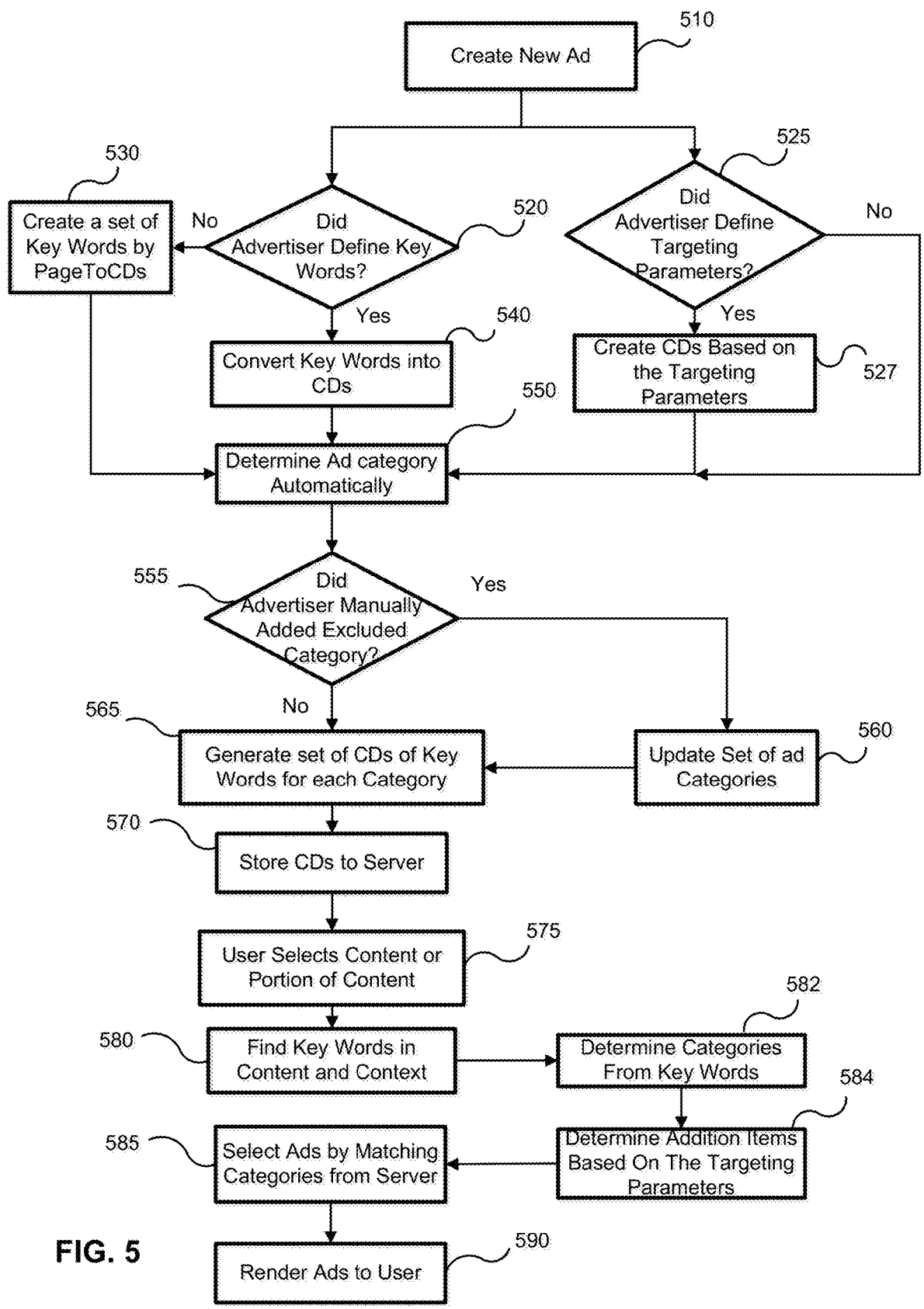
FIG. 5 illustrates a flow chart of a method for precise selection of advertisements, in accordance with the exemplary embodiment.

FIG. 5 illustrates a flow chart of a method for precise selection of advertisements, in accordance with the exemplary embodiment. An advertiser can create a new relevant information block or a target group or a campaign in step 510 (i.e., create a new add) and manually define the key words, and also he can manually define the targeting parameters. The targeting parameters—a list of attributes of Ad which describe the audience this Ad should be displayed to, including user age, gender, geo location, user viewing history, media site statistics, web site content, page metadata, etc. any social info about the user available globally, its browsing history or search queries. If the key words are defined in step 520, the key words are converted into CDs in step 540, and the process goes to step 550. Note that steps 520 and 525 are independent and can be executed in parallel or sequentially. If the targeting parameters are defined in step 525, then CDs are created based on the on the targeting parameters in step 527, and the process goes to step 550. The advertiser can also specify the URLs of his products or services. Otherwise, the key words are created automatically by PageToCDs algorithm in step 530. An ad category can be automatically determined for each relevant information block in step 550 using the following algorithm :

Derive relevant information block CDs using key words;

Determine a leading category or categories for the relevant information block based on a voting algorithm;

A target group category is determined as a set of relevant information block categories of the target group ordered in the descending order of occurrence frequency;

CDs and a category are derived from the context. A heuristic algorithm for finding the key words specific for the page and for the entire category is applied. The parts of speech analysis of the text is performed. The CDs sets are created and the categories are determined by voting.

A relevant ad for a context is determined as an ad, which has a category that corresponds to the category of the context. Sorting of ads can be implemented by voting algorithm: CDs of the context vote for relevant information block CDs. A number of CD votes are calculated for each relevant information block and the relevant information blocks are sorted in descending order of votes.

CD is an entity which has a context object (i.e., keywords, bigram) and a weight assigned to the object. The higher the weight, the higher the importance of the object. A voting algorithm is implemented as follows. The candidate objects and voter objects have their properties and weights. Initially, the votes for each candidate equal to zero. Then, for each candidate and for each property the weight of the property is added to the candidates that have this property. The winning candidates are the objects that collected the most votes.

Then, the process goes to step 555. If the excluded categories are added by the advertiser, then set of major ad categories are updated in step 560:

adult, automotive, business, finance money, entertainment news and gossip, food and drink, games, health and fitness, movies tv, music, news and weather, shopping, social networking, society—latino, society—men's lifestyle, society—women's lifestyle, sports, style and fashion, technology, travel, utilities, etc.

Then, for each of the categories, a set of context descriptors (CDs) entities containing text features (keywords, bigrams) is created in step 565. The CDs describe page data as follows:

A set of search phrases for a category is created;

A set of search phrases for a category is created;

A page URLs that are considered basic for a given category is derived using a search system API. An arbitrary number of URLs can be derived.

Each page is processed by an algorithm PageToCDs, which converts the page content into a set of CDs. The CDs are used as coordinates in the space of context to measure similarity or relevance between them. A cosine matrix is used for calculation of the CDs.

A set of CDs ordered in a descending order based on occurrence frequency defines a category. The most frequent CDs describe a category better than the less frequent ones. An algorithm for deriving CDs can be manually modified in order to filter results of PageToCDs algorithm.

Then, the process moves to step 570. The process stores the set of CDs onto a server. In step 575 a user select a content (or portion of the content). The process finds the key words in the selected content in step 580. Then the process goes to step 582, where categories from the key words are determined, and in step 584 the system determine addition items based on the targeting parameters. The process selects ads by matching categories from the server in step 585. The selected ads are rendered to a user in step 590.

According to the exemplary embodiment, the PageToCDs algorithm is used. The page metadata is selected and the stop words are deleted. The page headers are selected and the stop words are deleted from them. The parts, information, words, which are metadata/headers and the stop words, are not taken into consideration during the analysis, and can be removed from the content intended for analysis. The most frequently used keywords/bigrams are selected from the aggregated text. The keywords/bigrams are converted into CDs. The weights are assigned based on the location of the keywords/bigrams—the paragraph is assigned a higher weight and the header is assigned a lower weight.

FIG. 6 illustrates an exemplary analysis of content elements (see FIG. 3, step 340; FIG. 4, step 410). The visible area 620 (e.g., an internal part of an Internet browser 650, a document opened in a word processor, a video stream in a video player, an image in an image editor, some web-based content, see FIGS. 1, 6, etc.) is displayed on the computer device, e.g., a tablet touch-sensitive display, TV, desktop or laptop screen. The area may contain geometrical objects, sentences 610, paragraphs, 620, text columns 630 (in this case, columns provide an additional logical connection), text headers 640, etc., which can be identified by the user as independent elements. As mentioned above, among such objects can be an image 660, an image part (FIG. 10, element 1040), a portion of textual content (a part of the text, a word, a sentence, a paragraph, a scheme or its parts, a graph, a 3D model or its part, some video, and so on).

Note that the logical and geometric relations/relationships between objects are relations between words, phrases, sentences, paragraphs, entire contents of the webpage, advertising, banners, 3D content, video, portions of words, portions of phrases, portions of sentences, portions of images, portions of video, which include (but not restricted to) relations of geometrical adjacency, logical depencency, sequence and inclusion/constitution hierarchy.

Objects may be disconnected, i.e., located on opposite sides of the screen. Thus, it is necessary to make a logical (and/or grammatical) connection between content elements, rather than a geometrical one. Items 670*a* and 670*b* (see FIG. 6) represent a sentence, some words of which were carried over to another column, thus breaking its geometrical integrity (one part of the sentence is the geometrical element 685*a,* and another part is the geometrical element 685*b,* and since these elements are located in diffent areas of the screen, they are not geometrically connected,), but keeping its logical integrity (each word belongs to the same sentence 670*a* and 670*b*).

The sentence 620, which belongs to geometrical objects (here, the grid 665, which divides the screen into equal areas 665), can be seen as an example of both geometrical and logical integrity, note that the geometrical integrity condition can also be applied to image parts, as image parts, which are located close to each other, may be considered to be connected, and such a connection may be refined logically: if two or more image parts have similar colors on their borders, they can be considered to be connected to each other (if needed, an additional mechanism to determine logical connection can be used, depending on the weights of the image parts), otherwise they can be considered not connected.

An additional algorithm and logic can also be employed, which can take into account different colors on borders of neighboring image parts in order to determine whether these parts are connected or not. For instance, the algorithm may be pre-programmed to consider a color sequence (red-orange-yellow-green-blue-indigo-violet) to be connected, because it belongs to a "rainbow" object. Likewise, the reverse sequence of these colors may belong to a "reverse rainbow" object. Thus, geometrical integrity may be accompanied by a logical (grammatical) one, as well as by intermediate algorithms using analysis of the analyzed object components; at the same time, logical (grammatical) integrity may be accompanied by a geometrical one, since neighboring objects are often connected.

If the text is divided into parts, which are carried over (e.g., to different screen edges), then the words are connected logically, not geometrically, since they are located far away from each other. FIG. 10 shows an example of a logical connection in an expression 1030, where the words themselves are not connected, since they are located far away from each other. In FIG. 10, item 1010 is a logical connection between a sentence and the article title, and item 1020 is a logical connection within a sentence. When a portion of content is selected, zests and interesting words can be displayed (and further can be selected/pointed by the user), even if they are located in different parts of the screen, since they are logically connected. That is, analysis and selection of relevant words involves portions of content, which may be located at any distance from each other, but are still somehow connected to each other, either geometrically, or lexically, or grammatically, or visually (i.e., similar images or their parts).

Note that logical connection elements 630 in FIG. 6, as well as items 1010, 1020 and 1030 in FIG. 10, are also area divisions, which are described below. Content may be divided into areas word-by-word, sentence-by-sentence, paragraph-by-paragraph, etc., where the areas are geometrical and of different sizes.

Also note that objects may be logically connected to each other. It is reasonable to replace geometrical integrity with a logical one in such cases as: image wrapped by text (see text wrapping an image, particularly, in items 1010 and 1030), text divided into columns, text forming an image or a geometrical shape (particularly, portions of content make vertices and/or edges of planar or multidimensional figures, e.g., text written on sides of a cube, or in circle).

An example of a logical connection can be seen when searching for images using search engines, since the images found may be located quite far away from each other geometrically (even on different screens or search tabs), while still be logically connected by image search parameters. Also, an image file with a picture may be logically connected to an image while with a text, e.g., a scanned or photographed document. In order to establish a logical connection in such case, tags, common words, search words, as well as text and image recognition methods can be used employing additional algorithms to establish connection between the items. Thus, for instance, item 1040 is connected to the text in FIG. 10 not only geometrically (i.e., by being located close to it, and on the same page as well), but also by the content of the image 1040, which can be analized in order to establish a logical connection.

Any content has a number of prominent points, i.e., features. Features may be related to a group of logically connected objects, a visible area, documents of similar category, user history, etc.

According to an exemplary embodiment, object features are determined, which are related to a visible area, a document (e.g., a newsfeed on the page or any single news item), documents of similar category, similar documents, as well as image features, which are related to other images or objects. Images are different from each other, so there are some points of interest, e.g., different color, different shape or view of the depicted object (if image analysis is on). The same goes for image parts.

Features may be related to history, e.g., viewing history, user history, page actions history—which links were used most of all, what ads were shown most of all, and what were the subsequent actions on part of the user and/or the system. Features may also be related to other users' histories, namely, which links were offered and which ones were clicked on most often. A certain link weight can grow compared to other links, since it is being clicked on more often. Another key factor is analysis of linked page actions: e.g., whether users buy anything more often than on other pages or view additional advertising content.

After objects in the visible area have been found and geometrically close featured objects have been determined, it becomes possible to show them to the user.

Featured objects are shown (e.g., highlighted, underlined, etc.) to the user. The user may select highlighted objects or, say, another word from the text—which interests them more. Computing (highlighting) of the selected objects can be limited by a certain portion of the content: usually, it is a self-contained portion, e.g., a paragraph, a sentence, a word, an image—all in connection with the page header, history and metadata. The user may refine featured words offered to them by expanding object(s) highlighting, combining highlighted objects, etc. After the featured words (either original, refined, or chosen by the user) have been selected, the relevant content is shown to the user. The relevant content may contain advertisements taken either from our ad server, or from advertiser's server, or any other specified place, as well as it may be general, taken from known sources, such as YouTube, Wikipedia, etc. Both advertising and original content (origin content) may be generated before being shown to the user.

Thus, based on user history, their actions, payments, social network activity, their social status, latest purchases, money transfers, etc.—content may be generated and tailored individually for this user and then shown to them: e.g., a special sale offer for a luxury or non-luxury car, or some car in different price ranges. Thus, the user will probably be interested in cheaper brands, if they have been surfing through web pages with upmarket cars, and vice versa Likewise, the user may be offered a loan with a tailored interest rate or credit amount, depending on the size of the company they own, its sphere of activities, etc. The system can determine this based on visits of other pages by the user, from the data he used to get to this page (e.g., in social networks), from search engine queries, based on bank and credit card payments to which it has access, based on registration data, and any other data that can be collected (or will be permitted to be collected) on the user's computer. The data can be stored locally or can be sent to a server.

Calculation of geometrical positions for each word and letter in the text is a rather computationally intensive operation. In order to calculate an area and objects of special interest (e.g., an area tapped by a stylus or a finger) in the visible area, the following methods can be applied:

1) Let there be a rectangle or a group of rectangles in the visible area. This rectangular area contains a number of objects. The dimensions of the area mey vary depending on the object size, and they can be predefined based on empirical calculations, i.e., it is possible to find the average size of a paragraph, a sentence or a word, depending on the language used to make up the text. The same can be done to calculate the size of an image or its part, based on its geometric dimensions, color scheme, file size (in megabytes), etc.

When analyzing displayable objects, some elements, which are hidden from the user, may be applied as well; in HTML and XML this is, for instance, image description tag, that is, the image name, which is shown only if the mouse cursor hovers over the image. Such elements may be invisible for the user, but they will be taken into account when conducting a contextual analysis in order to find a featured object and determine its connections with other objects. The connections can be to one object, to multiple, or to all the available objects. The objects, in this case, are everything that is on the page, including things that are normally hidden from the user but are still part of the content. Also, the connection can be to other objects that are linked to the above objects or to the user's current hardware device, or to objects on the previous page, objects displayed in background (open applications, websites, battery level of the hardware, time, time zone, map, geolocation, etc.), scripts (e.g., javascripts on a page, even if theya re not active at the moment, but which might, under some conditions, be activated). The results of the execution of the script can also result in a link to an object, as well as plugins and applications that are waiting for results of execution.

2) Layout algorithm (e.g., left-to-right, top-to-bottom) is also important to determine featured words and to locate an area in the text tapped by the user. This algorithm may be known from text attributes; in HTML, for instance, it is known from the page layout, namely, tags: e.g., line break tag <br>, <table> </table> tags, which show that there is a table between them, or <strong> </strong> tags, which have some text in-between. Text style tags, such as italics tag <i> or boldface tag <b>, can be analyzed as well. In other words, to establish the algorithm for layout of objects in the visible area, all necessary built-in element features can be used, which are responsible for object placement in visible or hidden areas.

For mobile applications (e.g., apps for Android or iOS), such division for text and graphic areas can be taken from the layout and written in the XML format. The layout is used to place visible elements in a number of ways.

The layout is the description tool for calculating the location of objects on the component (such as web-page, an application window, a panel with text or/and images). This functionality can be part of an application or as an application library. Page layout is the computation of the position of the paragraphs, tabs, sentences, words and letters of a text, or computation of the position of the images, parts of the image, video, scheme, graphs, i.e., relative position of objects on the component (a component should be able to display the visual information. This is done by desktop publishing software, typesetting software and layout engines (web browser engines). It can include font layout and rendering engines that calculate the correct position of glyphs, which can be a challenge with scripts. Images can also be embedded in the text.

Another form of layout is able to automatically calculate an application's (or widget) position based on alignment constraints without the need for the programmer to specify absolute coordinates. Graph drawing software can automatically determine the position of the vertices and edges of a graph, with various goals, like minimization of the number of edge intersections, or minimization of total area or production of an aesthetically pleasing result. This type of software is used for multiple purposes including visualization and as part of electronic design automation tools.

The layout engine can be used for layout management. For example, a web layout engine represent a software component that takes marked up content (such as HTML, XML, image files, etc.) and formatting information (such as CSS, XSL, etc.) and displays the formatted content on the screen. It draws on the content area of a window. A layout engine is typically integrated to web browsers, on-line help systems or other applications that require the interaction of the user with the web content (browsing, editing, coping, end, etc.).

3) Approximate object dimensions (width and height) can also be calculated and used to determine featured areas. Therefore, it is possible to suggest that letters and numerals in the same portion of the text have the same width and height, which can be calculated based on the object attributes; in HTML, for instance, font size and style are set using corresponding tags.

4) In order to calculate areas and objects of special interest, the point in the visible area is taken into consideration, which has been targeted by a mouse click, screen tap, or otherwise, using devices allowing to select or point out a certain area or object (interactive goggles, various cameras and sensors, e.g., heat, capacitance or resistance sensors). That leads to focusing the user's activity.

5) For each object, or an object group, an area they are connected to is determined (so called "object range"). These are objects that can get into the area around the tapped or clicked point. This area may be fixed or may be calculated based on the device specifications (screen size, screen resolution, visible area [since some windows, which are always on top, may overlap with parts of the screen], window size—e.g., for web browser or document [file, image, mixed type, etc.] viewer). The object range is used to include (or exclude) the object into (or from) the list of relevant objects and objects used to determine contextual connections. In other words, if area around an object overlaps with a 15-pixel area around the tapped point (or the tapped point itself, or some area, a word, a part of a word or a sentence, an image part, etc., selected by the user), then this object is potentially relevant for the area.

For instance, when choosing the most relevant objects, the object range may be used to define the object's weight. The object's weight determines whether the object is included in the list of relevant objects, since the object's weight can decrease depending on its distance from some other potentially relevant object or a tapped point.

Algorithm basics: The number of objects located in the analyzed portion of content is usually known, but this number can also be approximated and calculated empirically. A website(s) comprises web pages of the same type, or with a scientific article, which, as a rule, have some standardized design, options for content location and layout are usually not very different, and therefore it is possible to determine the average word length and sentence length (e.g., the average word length is 7 letters, and the average sentence length is 12 words, excluding prepositions and filler words), as well as the average number of sentences in a paragraph, the average number of paragraphs on a page, and also which portion of the visible area is occupied with an image, since if the pages in question have the same layout and have been created from the same template, it is possible to conclude that a visual element of a certain type will always occupy the same portion of the screen area. Therefore, the content location on the page is closely connected with the size of the window (displaying this content) and its components: e.g., geometrical locations of content elements may depend, besides their types, on the device screen resolution, the size of the application window displaying the content (namely, its width and height), the size of the visible area of the window displaying the content, etc. All these attributes allow to determine the locations of the elements within the displayed component (a window, a vidget, etc.). When dealing with a text, the number of letters, words, sentences, paragprahs and images, those can be calculated directly.

In order to find and analyze relevant objects, the analyzed area (i.e., visible portion of content: text, image, scheme, graph, video—either as a whole, or as a part), since its width and height are known, is divided into smaller areas (see FIG. 6), e.g., rectangular ones, of the same size. Geometrical dimensions (height, length, etc.) of a string, a word, as well as their vertical and horizontal spacing, and other attributes are known or can be retrieved from the object metadata. The object metadata are, for instance, either tags (in HTML) or the document layout (in MS Word). Note that the division may be not homogeneous, since the rectangular areas for shorter and longer strings may differ in size by a factor of two or more. There may be both short and long strings in the same content, depending on its structure, e.g., text may be wrapped around an image, or it may be partially covered with semi-transparent content elements (which are displayed on some other layer, which is on top).

Instead of a rectangular area, there can be an area of any other geometrical shape: polygonal, square, circular. Thus, if the algorithm of the content layout is known, it can also be found out which objects will get into each rectangular area. Some of these areas may be empty (see FIG. 6, item 690, and FIG. 10), since a sentence may end mid-string or may be automatically transferred to another page (using layout engine, or a web engine), if the word is long and there is no room for it on the page.

Note that this algorithm for determining whether a word (a portion of content) is located within the area, the content of which is to be contextually analyzed, and for finding relevant words can be applied not only to web pages, but also to any kinds of documents (including text documents of various formats, such as MS Word, MS Excel, etc.), images (including vector ones), videos, graphs, schemes (e.g., MS Visio drawings, including graphs), 3D-models (made in 3D Studio MAX, Blender, Maya, etc.) and others.

If the text itself is not known, but its location on the screen is, then based on its geometrical parameters (approximate height and width of objects) it is possible to divide the visible area into several parts, that is, create a grid with cells of the same size, which covers a rectangular area. Note that it is also pissible to create several rectangular areas in such a way.

If the number of letters in a string is known, then based on the layout algorithm (operating from the page metadata, text and image attributes, page or document layout, etc.) it is possible to find out that the string is not fully, but partially filled (e.g., up to the middle), whereas the empty area may be located either in the end of the string, or in the beginning, as well as in the middle of the page (in case there is an image that is wrapped with the text, or the page is divided into columns, etc.). The relative positions of text and empty places may, correspondingly, change depending on various parameters, such as device specifications (different devices display the same page in different ways), change of screen orientation (portrait to landscape and vice versa), change of page scaling, change of web browser window size, change screen resolution on a device, etc. Thus, empty places will be located in different positions.

Thus, there is some uncertainty as to the size of the empty places. The bigger the empty places, the higher the uncertainty. This uncertainty should be added to the range.

Then, the coordinates of the tapped point are retrieved from the device and converted into the grid mentioned above, i.e., calculate exactly which rectangle has been tapped. Adjoining rectangles are also calculated. When calculating these rectangles, empty rectangles are taken into account as well, which have been calculated before (see above).

The [x,y] coordinates of the tapped point, i.e., screen coordinates (in order to calculate these coordinates, for instance, in Android, standard methods can be used: e.g., the Java programming language has getX(int) and getY(int) methods, which return correspondingly x and y coordinates of the tapped point on the screen), are converted into the grid coordinates [m,n], where m and n are the numbers of the grid rectangles counted, for instance, starting from the upper left corner of the screen.

Then, according to the algorithm for division of the visible area into rectangles (e.g., in the top-to-bottom, left-to-right direction), m and n are converted into an exact place (position) in the text (e.g., if the algorithm mentioned earlier is used and, say, a row consists of 5 rectangles, then the $3^{rd}$ rectangle in the $2^{nd}$ row will be the rectangle number 8). Note that there are various algorithms for division of the visible area into smaller ones, both homogeneity and not, depending on the type of the object to be divided, its uniformness, whether it is mixed with other objects, either similar or not, and the type of sub-areas, which the visible area is divided into (rectangles, polygons, triangles, etc.). Depending on the specific algorithm used, the grid position to be calculated may be written in different formats: in a linear format (1, 2, 3 . . . ), a planar format ([x,y]), a relative format (e.g., according to its shift from another object: e.g., if the reference object is the centre of the screen, then the sub-areas may be numbered in a spiral, in lines starting there, or in concentric circles, etc.).

In an algorithm working in the top-to-bottom, left-to-right direction, the grid coordinates of the tapped point (Position) are calculated as: Position=n*w+m, where n is the length of the string (in letters).

Then, uncertainty is added to the range mentioned above: +/−R=H*W−L, where L is the number of objects (text length), H*W is the number of grid cells, W is the width of the visible area (in pixels).

Thus, the range used to calculate the zest is calculated as: Position +/−R.

Objects, which have been found by the zesting algorithm, are marked as objects of interest (interesting words, interesting subset of the content, zests). Also, some objects, which a logically connected to them, have already been determined (they are not highlighted in the text).

In FIG. 13, 'total' is connected to 'electric capacity' through a word. Photovoltaics, electric capacity, this week, Electricity Monthly Update, etc. are zests. The "owners of solar systems" word combination and the word "owners" are words, connected to the "solar systems" zest. "of" is only shown as a part of the zest and is used to calculate the zest, while being essentially not a part of the zest, since it possesses no useful information.

"Electricity" and "Monthly Update" are connected logically, while not geometrically, since they are located in different geometrical areas, but logically (grammatically) belong to the same zest.

FIG. 14 is a diagram, where probability density concentration for appearance of a featured word is shown. Peaks are zests and/or featured areas (zest+connected elements). The higher the peak, the more featured the word/area is.

When searching for relevant data, as was mentioned above, zests. To calculate them, in turn, we use semantic profile of the text. A semantic profile is a group or individual object code, which can be retrieved, for instance, by using "Semantic differential" scales. Semantic profile allows to calculate subjective proximity (similarity) and distance (difference) of objects in semantic space.

Semantic differential is a method used to form individual or group semantic spaces. Object coordinates in semantic space are its ratings retrieved from a number of bipolar graded (with 3, 5 or 7 grades) rate scales. The opposite extremities of these scales are verbal antonyms. These scales have been selected from a plurality of test scales by factorizing.

The term "semantic space" is used to define the representation of word meaning in semantic memory theories, which delve upon some kind of spatial models of mnemic forms, e.g., semantic networks.

A semantic network is an informational model of an object domain, which appears as digraph, where peaks correspond to the objects on the domain, and arcs (edges) define their relationships. Among objects, there can be ideas, events, features, processes. So, a semantic network is a method of knowledge representation. A semantic network represents semantics of an object domain in the form of ideas and their relationships. Thus, a semantic network is a data structure, which consists of nodes corresponding to ideas and connections, which point at relationships between the nodes. The most important connections are "Is-a" connections, which allow to create a hierarchy of ideas in a semantic network, i.e., low-level nodes inherit features from upper-level nodes.

The semantic profile of the text is constructed to get a set of CDs needed to determine the degree of proximity between text documents and their belonging to certain categories (when a list of categories is given, either manually or in the process of, e.g., subject probability modeling of simple clustering). In order to define the semantic profile as correctly as possible, structural division of the text is rather important, namely, presence of paragraphs and headings. Metadata can also enhance the algorithm, namely, key words, which have already been found and listed.

Note that each formal grammar rule used to extract a zest has a corresponding zest weight, which represents the significance of the zest chain that satisfies the rule, for example:

. . .
Zest → Person
Person → FirstName MiddleName SecondName (0.5)
Person → FirstName SecondName (0.4)
. . .

where 0.5 and 0.4 are zest weights. Given the rules of the exemplary text fragment formal grammar, then a word chain comprising the whole name (first, middle, second) is the zest with more weight than a chain comprising only first and second names.

The zest extracting algorithm operates with zest weights, which are set in the formal grammar rules. Thus, the algorithm output assigns weights to word chains. There could be several weights assigned to zests (or chains), for instance, chain length weight and zest "quality" weight. Together, they constitute a vector. Depending on zest and/or chain weights, it is possible to draw a boundary line between "strong" and "weak" zests, in order to eliminate the "weak" ones, if necessary.

A zest extracting algorithm modification operating with weights is described below. This modification is needed to extract the same number of zests from texts of various length, the number being enough for the user not to be overwhelmed by them and enough to extract at least anything from small texts. That is, the bigger the text, the stricter are the boundaries between zest-containing chain weights.

Example (zests are inderlined):
Text1: ". . . gear wheels to the next transmission first, and then swith the clutch immediately with no torque loss . . . "
Text2: "The main feature of this transmission box (DSG) is that there are two separate shafts for odd and even gears, both of which are operated with their own clutches. It allows to switch gear wheels to the next transmission first, and then swith the clutch immediately with no torque loss."

Text1 is a part of Text2, but not all zests from Text1 are a subset of the set of zests from Text2, because the longer the text, the wider the choice of possible zests is, and therefore the boundary used to eliminate "weaker" chains is stricter.

Zest extracting algorithm operating with zest weights is used to implement the above mentioned ideas, that is:

1. The zest boundary weights are assigned as a vector set, since there are several weight groups. This set may be sorted according to the decline in "aggregate power". A minimum of text zests may be assigned to each vector boundary, which should meet the required weight. If there are less zests than needed, the boundary is lowered. For the sake of convenience, the last vector boundary consists of zero elements and zero minimum number of chains, which should meet the required weight.

2. Zest chains with zest weights are extracted.

3. Then the number of zests, which meet the required weight, is tested for each vector boundary, beginning with the first one. If this number is less than the minimum limit, then the next boundary, which is weaker, is taken. When the number of zests is equal to or more than the minimum limit, the algorithm is stopped, and the zests are given as the algorithm output. The sequence is repeated until the last vector boundary is taken.

FIGS. 15A-15C illustrate how the level of hierarchy is calculated in order to calculate zesrs. The content element analysis level is a group of content elements to be analyzed, e.g. for zests, chains, etc. The item 1510 in FIGS. 15A-15C is some content displayed on the device screen. This could be a web page, a document (e.g. a text document with images), video and audio files, etc. The content 1510 may comprise images, video fragments (not shown in the figure), or textual elements, such as paragraphs (1540, 1550, 1560, 1570, 1580) or sentences (1541, 1551, 1561, 1562, 1571, 1581). Note that a particular paragraph may consist of only one sentence (1541, 1551, 1581, 1571) or several sentences as well (1561, 1562), while sentences themselves may consist of word groups (not shown in the figure) and words (1580, 1590). Item 1520 is the interaction point between the user and content (the point, which has been clicked, tapped, gestured etc.). Item 1530 is an area surrounding the interaction point, which is used to define potential content elements to undergo the analysis. The size of the area 1530 may be determined either empirically or based on device specifications, text type and size, its layout, page metadata, various elements presented on the page (e.g. text and images, images and ads), etc.

When analyzing the level of hierarchy is used to extract information for zest calculation and displayed content selection, content elements are taken, which are located entirely or partially within the area 1530 or nearby. Among such elements there can be words (see item 1580, for instance), sentences (items 1541, 1551, 1561, 1571) and paragraphs (items 1540, 1550, 1560, 1570). Elements, which are not located within the area 1530, are words like 1590, etc., the sentences 1581 and the paragraph 1580.

The level of hierarchy, at which zests are to be analyzed and extracted, has to be determined according to distribution on a specific layer, e.g. word-layer, expression-layer (not shown in the figure), sentence-layer, paragraph-layer, the entire content, etc. Distribution, in this case, corresponds to features of elements on each layer located within the area 1530 or at some distance away from the interaction point. FIG. 15A illustrates how elements on each layer belong to the area surrounding the tapped point (item 1530). Note, that a hierarchy level may be determined by a word, an expression, a setnetnce, a paragraph, the entire content, an image or its component, or a part of a video component—that is, an optimum level is chosen, so that the prominent content elements can be seen. In other words, if during analysis of the highlighted and neighbouring/adjacent parts of the content it appears that the most prominent elements (which correspond to peaks in the present graph) are words, then the algorithm works with words; if the most prominent elements are paragraphs, then the algorithm works with paragraphs. It also should be noted that different hierarchy levels may be established within the entire content or its parts, therefore, for instance, a text column may be processed on both word-level and sentence-level.

Such words, as "human" or "communication", are not fully located within the tapped area 1530, as well as the sentense 1541 and the paragraph 1540, and therefore these elements do not affect zesting very much. Basically, the following analysis is similar to allocation of weights to each element on a certain layer. The more elements there are in the tapped area and the closer they are located to the tapped point, the higher the probability is that these elements will become zests during zesting (as it happens with words and word groups), since zests will be extracted from them, like, for instance, "NLP" from the sentence 1561, or "Patterns" from the sentence 1562. Words like "so", "can", "and", "others" from the sentence 1551 are fully located within the tapped area 1530, so they could become zests, but they have been left out at an earlier stage as garbage, or "non-sensical", words. Such words usually do not affect zest extraction and cannot be regarded as zests as well. The word "doing" is only marginally situated within the tapped area, that is why is does not affect zesting very much, while the word "people" is fully located within the area and thus affects zesting directly, whereas it may be considered to be a zest itself.

Words, which are located outside the tapped area, such as "communicate" from the sentence 1551, do not affect zesting as much, though the degree of their remoteness may be taken into account while zesting, E.g., they may be regarded next after it has been determined, which words are located within the tapped area, or they may be used to refine the selection. The selection refining (highlihthing) is also vey important, as mentioned above. Highlighted words are among the most probable elements to become zests. For example, the text in the figure contains "Neuro-Linguistic Programming", "NLP", which might also become zests, though they are situated on the margins of the tapped area. Note that synonyms may also be taken into account while analyzing content: for instance "studying" and "learning" may be considered one and the same word thus increasing its occurrence and lowering probability of them to become zests and/or be used in zesting.

At the same time, another occurrence of the word "communicate" from the sentence 1561 is located fully within the tapped area, which means it has a significantly higher potential to become a zest.

This discussion shows an exemplary analysis on the word-layer. As was the case with words from the sentence 1541, the word potential to form zests is extremely low, that is why it is reasonable to consider analysis on the sentence-layer. On this layer, there are sentences 1562, 1561, 1551, which have higher weights, whereas the sentence 1562 is very much different from the others, as it can be used immediately to form zests. Sentences 1561, 1551 may also contribute to zest formation, but their contribution of lesser value, since they contain much fewer potential zests than the sentence 1562.

On the paragraph-layer, there are paragraphs 1560 and 1550, but they are not very different from other paragraphs. That's why it is usually more appropriate to analyze sentences and words with potential zests, such as words, which are fully located within the area, and the sentence 1562.

Therefore, zests are formed mainly using word peaks, which are located within the tapped area, while the paragraph 1580 and its constituent parts do not affect zests much.

Another implementation of the invention relies on processing of user interaction and reading of user intentions. "Intentions" are actions with elements, which the user wanted to highlight, or which (could) have interested him, as well as interaction types: selection, dragging, feedback sending, etc. Since content elements may be arranged differently depending on content styles, computing device configuration or orientations, etc., their logical and geometrical connections may change. Below is the algorithm for selection of homogeneous objects with determined (on-the-fly, when the method can be changed during or after the showing of the object) or pre-determined (for example, selected by the user, or the default method can be used) method of planar arrangement, when the focal point is indeterminate.

Consider the following problem: in a rectangular region of the screen having a size WxH there is a well ordered set of objects of similar dimensions (letters, text). At the same time, the object arrangement is strictly determined or pre-determined and described by a function: P=p(n, W, H, w, h), where P=<x, y> are the coordinates of an object with index n; W, H are geometrical dimensions of the region; w, h are average object dimensions. The region is almost completely filled by the set of objects. Here, "almost" means that the region itself is a minimal area with at least one of the given dimensions, which is enough for the given set of objects and the given arrangement function, for example, such as a paragraph rectangular area is minimal to cover the paragraph text but have an empty area after the tail line or before the first line. .

The task is to find an ordered subset of objects [ns, ne], which, with some probability, will intersect with the given coordinates, provided that the coordinates of the area of indeterminate click within the rectangular region are known.

This problem arises when looking for a quick solution for the problem of indeterminate selection in text, which would not require computationally intensive calculations of exact coordinates of letters and words. The algorithm given below can be expanded to analyze not only text objects with left-to-right directions of writing (so called, European-style writing), but also objects with symbol-based writing, and graphic objects as well.

An exemplary function for a text arranged from left to right, and from top to down/bottom can look like:

$$p(n, W, H, w, h) = \langle w^*(n \bmod [W/w]), h^*(n \text{ div} [W/w])\rangle,$$

where mod and div are operators of division with a remainder and exact division, correspondingly; and [.] is a value rounded to the nearest integer.

Further on, this case will be regarded as the most common one. Objects may be arranged either densely (with no gaps or overlapping) or sparsely (with gaps or overlapping). Either way, average geometrical dimensions of the object should be calculated taking into account gaps or overlapping.

A solution can be to recover the text parameters, when some of them are known, such as L, which is text length (number of objects), W, H, and $\beta = w/h$, which is the average ratio between geometrical dimensions of the object and can be obtained statistically for a given font on a text corpus.

1. Recover h: $h = \sqrt{(W^*H/\beta/N)}$
2. Calculate integer geometrical dimensions of the rectangular region, where cols is the number of objects in a horizontal line, and rows is the number of objects in a vertical line:

rows = [H/h]

cols = [W/h/β]

3. Calculate <x, y> of tapped position in integer coodinates <c, r>:

r = [y/H/h]

c = [x/W/h/β]

4. Depending on the arrangement function, calculate the linear position of the object in an ordered list:

$n = r^*[W/h/\beta] + c$

5. Add the range $[ns, ne] = r^*[W/h/\beta] + c \pm ([W^*H/h^2\beta] - N).$

In other words, this describes a method of determining user interests relating to multiple objects displayed on a webpage. After the webpage was presented to a user the system will identify a rectangular area(s) based on user interaction area which contains substantial part of it and which contains elements calculating area of which is computationally expensive. Note the webpage can contain multiple content elements. Further the identification of elements layout algorithm is used to place the content elements in the rectangular area, wherein the content elements may be floating in the area based on its geometric parameters size and font size. The next steps are the identification of an average geometric proportions of the content elements; and identification of the number of floating elements in the area.

The calculating of the grid parameters (rows and columns) are performed, which virtually divides the area to allocate all elements with some approximation. Further identification of which cell(s) of the grid contains user interaction area is performed; and identification which position(s) in the sequence (or hierarchy) corresponds to the cells of interaction based on layout algorithm used.

Further the position(s) to the range(s) of elements is extended by adding and subtracting a number of free cells (which were not used for allocation in the grid); and the ranges are provided to the algorithm of zest extraction.

FIG. 7 illustrates a flow chart of a method for semantic text profile construction. The semantic text profile construction starts, when the user selects some content on a page or taps/clicks on some location, where interesting content is located. Then the interaction point between the user and content of a page/document is determined (block 702). Then, in block 704, the interesting content is highlighted. The highlighted/selected content is then transformed in order to reach basic structural coherence, i.e., if the user selects a word, the whole sentence will be user for analysis; the same goes for a letter or a group of letters selected; and if the user selects a sentence, then the whole paragraph will be used, etc. (block 706).

In block 708, details for zest extracting algorithm are added, such as page/dovumetn metadata, context, user and device metadata, etc., which results in a structured text output for block 710. The system's input is a structured text 710—meaning that the system is able to distinguish the metadata, headings and main units (blocks) of the text (block 720) based on some of its features. An HTML-page is an example of a structured text. Then, all distinguished parts of the text are named items. All items undergo the process of stemming/standardization in block 730 and are cleared of stop-words. Then, all heading and metadata elements are transformed into vector form (Bag-of-words) in block 750. (The bag-of-words model is a simplifying representation used in natural language processing and information retrieval (IR). In this model, a text (such as a sentence or a document) is represented as the bag (multiset) of its words, disregarding grammar and even word order but keeping multiplicity.

Recently, the bag-of-words model has also been used for computer vision. The bag-of-words model is commonly used in methods of document classification, where the (frequency of) occurrence of each word is used as a feature for training a classifier.) Single words and word pairs (bigrams) are used as term features. The most frequently occurring terms are defined in certain text units (block 750). Main units are transformed into vector form in block 760. Then main units with the greatest proximity to the frequent terms vector calculated before are determined (block 770). In order to measure the degree of proximity, Kullback-Leibler divergence can be used, for instance. The most frequent terms are determined according to their fractiles and are then transformed into CDs (block 780). The semantic profile of the text in the form of CDs is then put in the database along with the unique text ID.

FIG. 8 illustrates a flow chart of the main method of the system for selection of relevant elements (in this example, the elements are words in the text). Note that the appearance of the flow chart does not depend on the language the text is written in; only the dictionaries that are used, formal grammar, etc. change, but the concept remains the same. The system's input is an unprocessed text containing, for instance, HTML-descriptors. The preprocessing module transforms this material into raw text, removing all technical constructions (step 810). Then, the text is divided into parts (e.g., sentences) to facilitate following processing (step 820).

The prepared data (e.g., text units array) undergo syntactical analysis (step 830) returning a plurality of syntactical parsing trees. Morphological analysis (step 840) is then used to determine parts of speech and forms of the words used. In order to conduct this step, a special set of dictionaries of various languages is applied (845). The resulting data undergo the processes of stemming/standardization and construction of special chains (step 850). Then some chains, which meet the rules of formal grammar of various languages (865), are selected (step 860), wherein formal grammar applied has rules of different weight, which are used to determine the weight of relevant words or zests. The chains are selected while maintaining automatic control over the minimal weight limit of a zest, which depends, in particular, on the text length in terminals and the total number of chains meeting the rules. The weight of relevant words is taken into account when selecting context data to be shown to the user.

In step 870, natural form of relevant words is added to the data retrieved, which is necessary to represent the correctly in an unprocessed text. Thus, the algorithm described above results in zests.

FIG. 9 illustrates precise selection of advertisements and graphical presentation of targeted ads to the user. The user can select a portion of the content 910. An item 940 is displayed over the content or in the browser menu or in a fold down menu. The user can open an additional window 960 (e.g., a new window in the browser or a window in the current browser). The ad or organic content 985 and 990 can be rendered in the window 960 in a designated area 970 along with items 980 (search, text, YouTube, etc.) reflecting user intents. The displayed ad or organic content 985 and 990 is selected based on: content analysis, content category, language, selected area of the content and user intents. Note that the user intent is explicitly displayed along with the free organic content.

Figure 16:
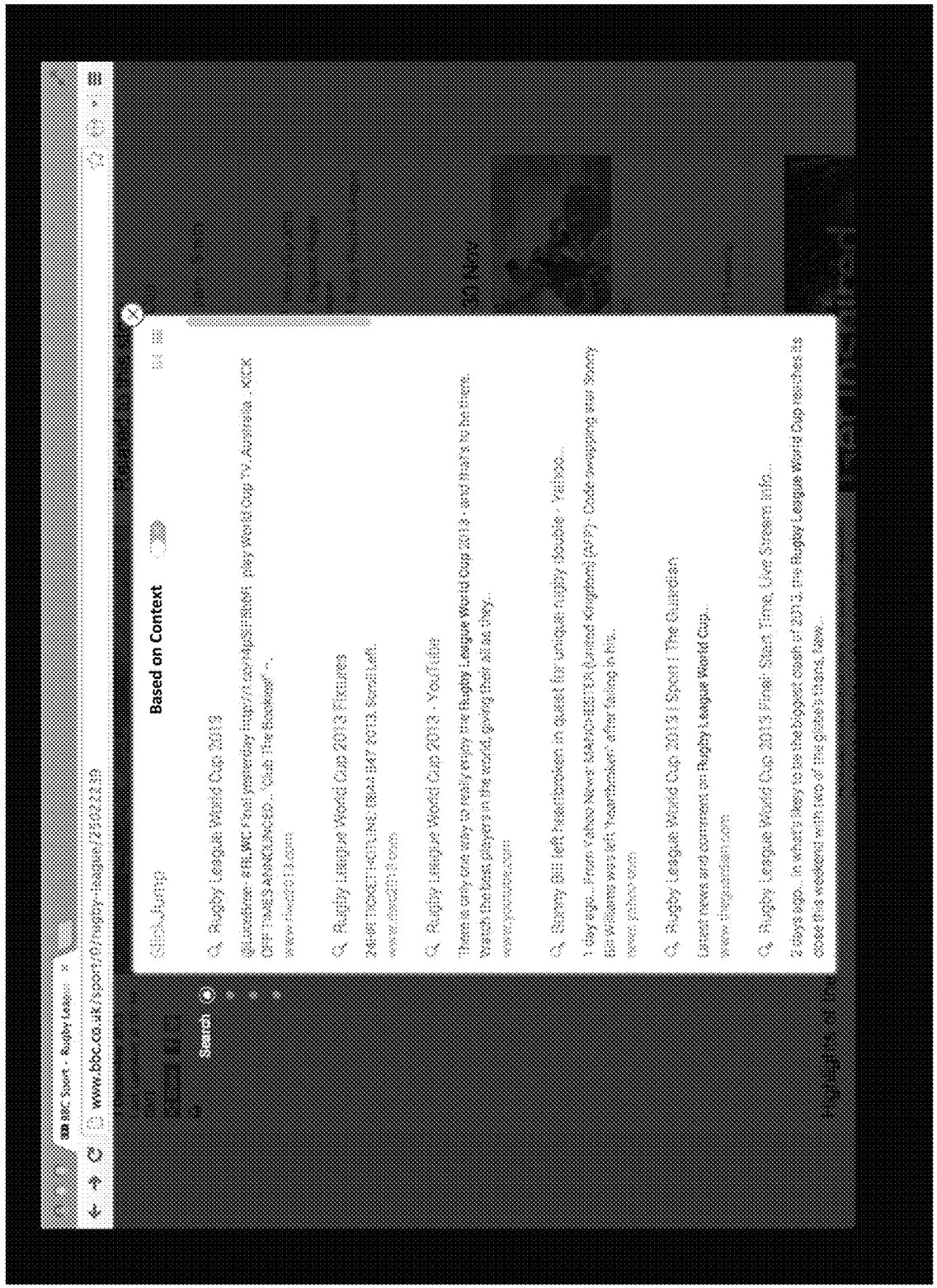

FIG. 16 illustrates mobile device screen. The relevant data is displayed according to user goals/wishes selected based on the context of the content. Once the relevant data block display element is activated the goals/wishes-related data is displayed. Once the goal is selected, the relevant data blocks are displayed. Additional examples of rendering the relevant data are displayed in FIGS. 17-19.

The algorithm for analyzing text elements of web pages PageToCD is an exemplary implementation of a Content-ToCD algorithm:

The transformation parameters ToCD are defines as ToCD={ImageToCD, MusicToCD, VideoToCD, PartOfImageToCD . . . } of some non-textual content descriptors. In case of music, the speech is selected and recorded onto CD. For images, the algorithm recognizes the images, describes them and stores them to CD. For video content, the algorithm divides the content into audio stream and images and processes them separately. The algorithm determines the extractor of base elements E—the algorithm can derive a metadata and a header. The extractor takes into consideration the page geometry and the current view and determines relevancy quintile q.

The algorithm performs the following steps:
1. Define textual content T and none-textual content P;
2. For P apply transformation;
Make a set of transformed element P' empty;
For each p from P:
Determine type y=Type (p)
Apply transformation ToCD (y, p) for a given type and receive descriptors and add descriptors as a separate set into P';
3. For T, derive a set of transformed elements T' and store t from T onto CD;
4. Derive T' U P'. Determine base elements B=E (T' U P'). Other elements are A=(T' U P')\B;
5. Aggregate all CD elements from B into one set V of unique elements. Determine the order and generate vector-function of vector argument CV, which calculates a number of intersections of element form V with an arbitrary set M. Additionally, a weight vector can be created by applying B to V. Then, CV multiplies a number of intersections by weight.
6. A set of relevant R is made empty;
For each a from A:
If sum(CV(a))/len(CV)>=q, add a to R;
Check the skipped elements, if found, decrease the quintile in half and add a to R;
7. Select CD for elements RUB by the quintile;
8. Release resulting CDs.

FIG. 11 is a block diagram of an exemplary mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a laptop, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to hectic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, the mobile device 59 can be configured as a base station for one or more devices. As such, the mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video.

The mobile device 59 can also include one or more wireless communication subsystems, such as an 802.11 b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

FIG. 12 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Those skilled in the art will appreciate that proposed system and method allow for effective advertising directed to the computer device users.

Figure 17:
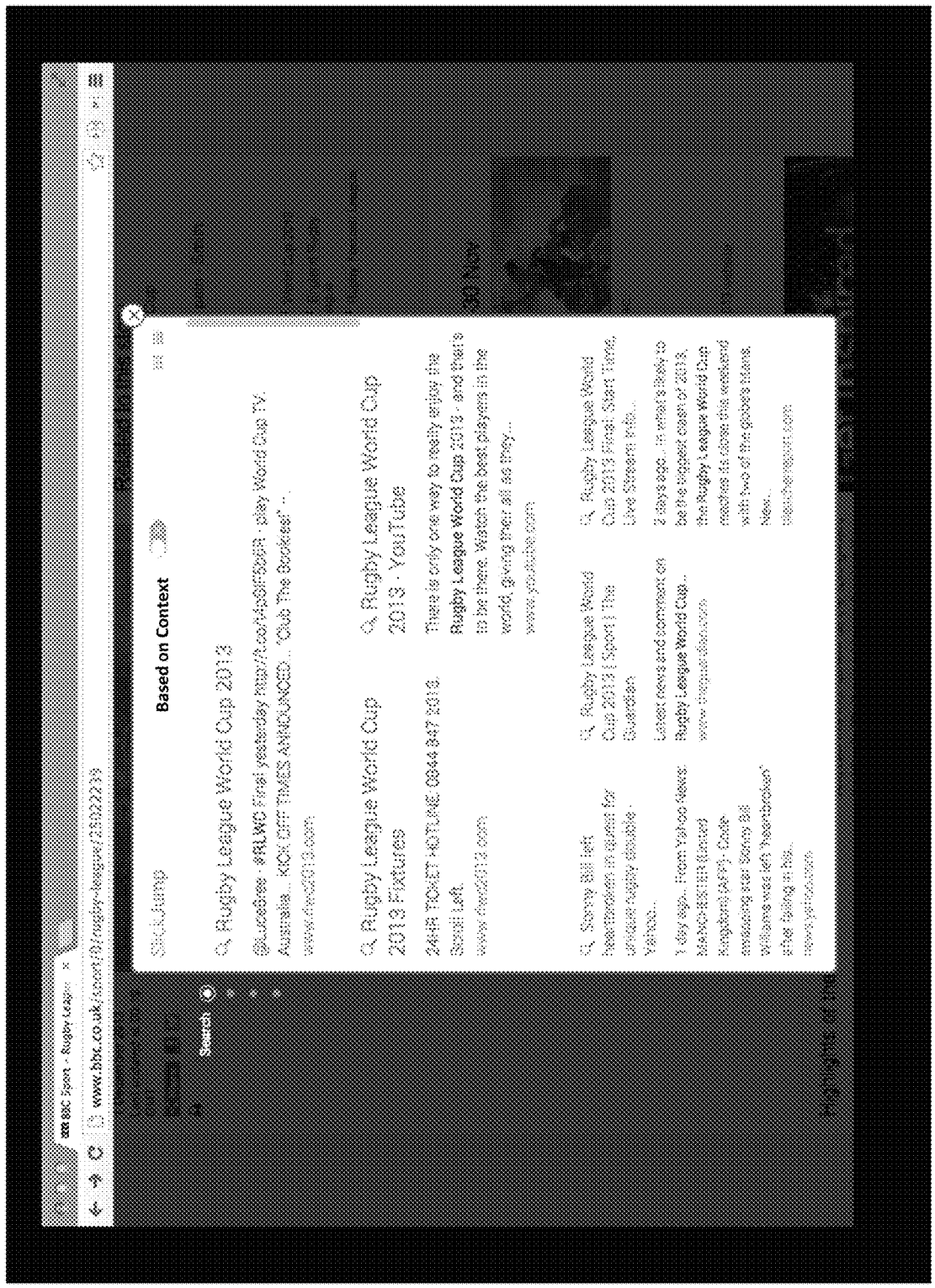

FIG. 16 illustrates how the plug-in is activated upon a click on the brightened word (or the collocation) from any web page FIG. 17 illustrates results and menu for intents: such as search, image, video and definition. The results of intent "search" is open by default.

Figure 18:
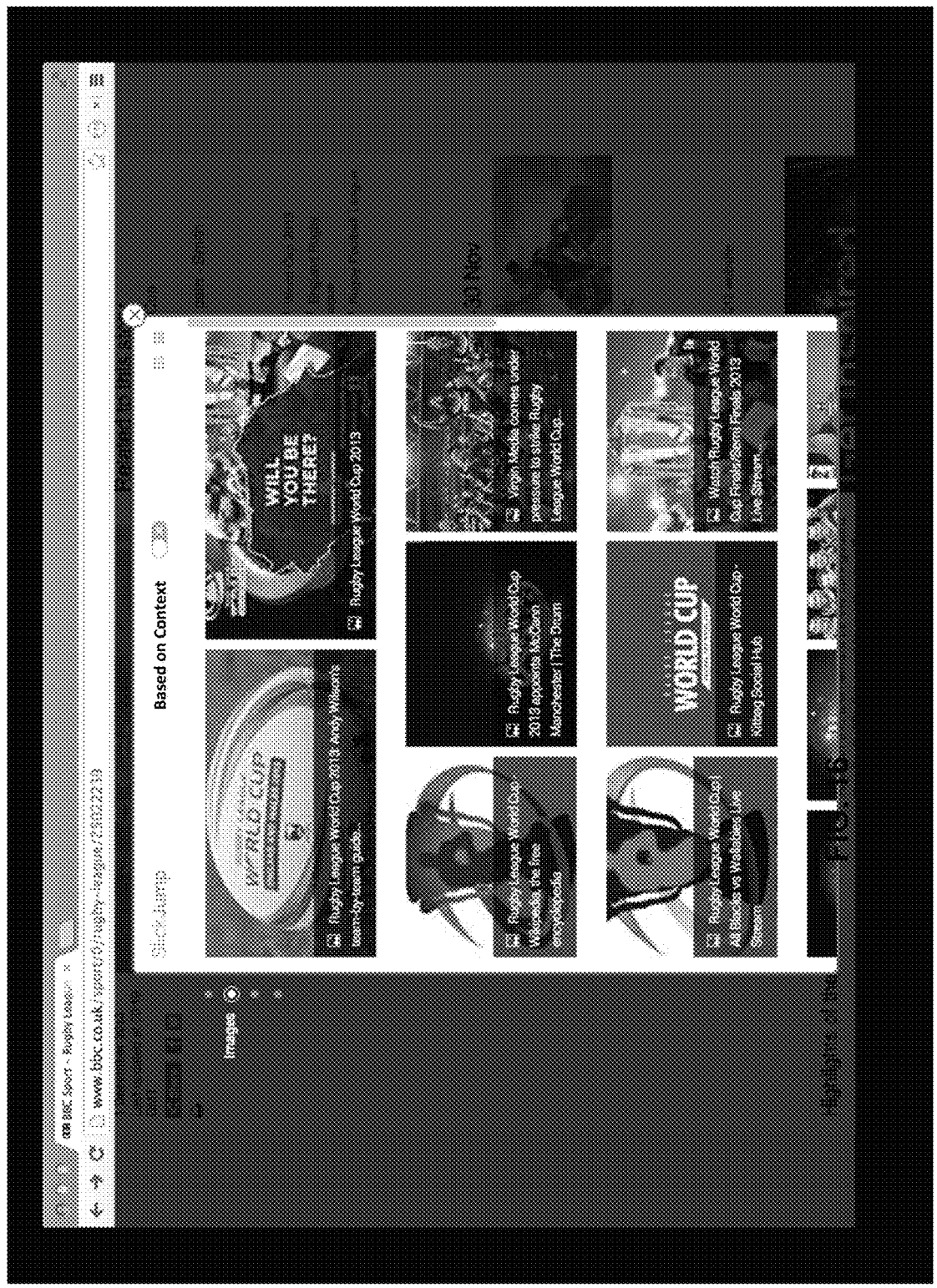

FIG. 18 illustrates results of the intent "image."

Figure 19:
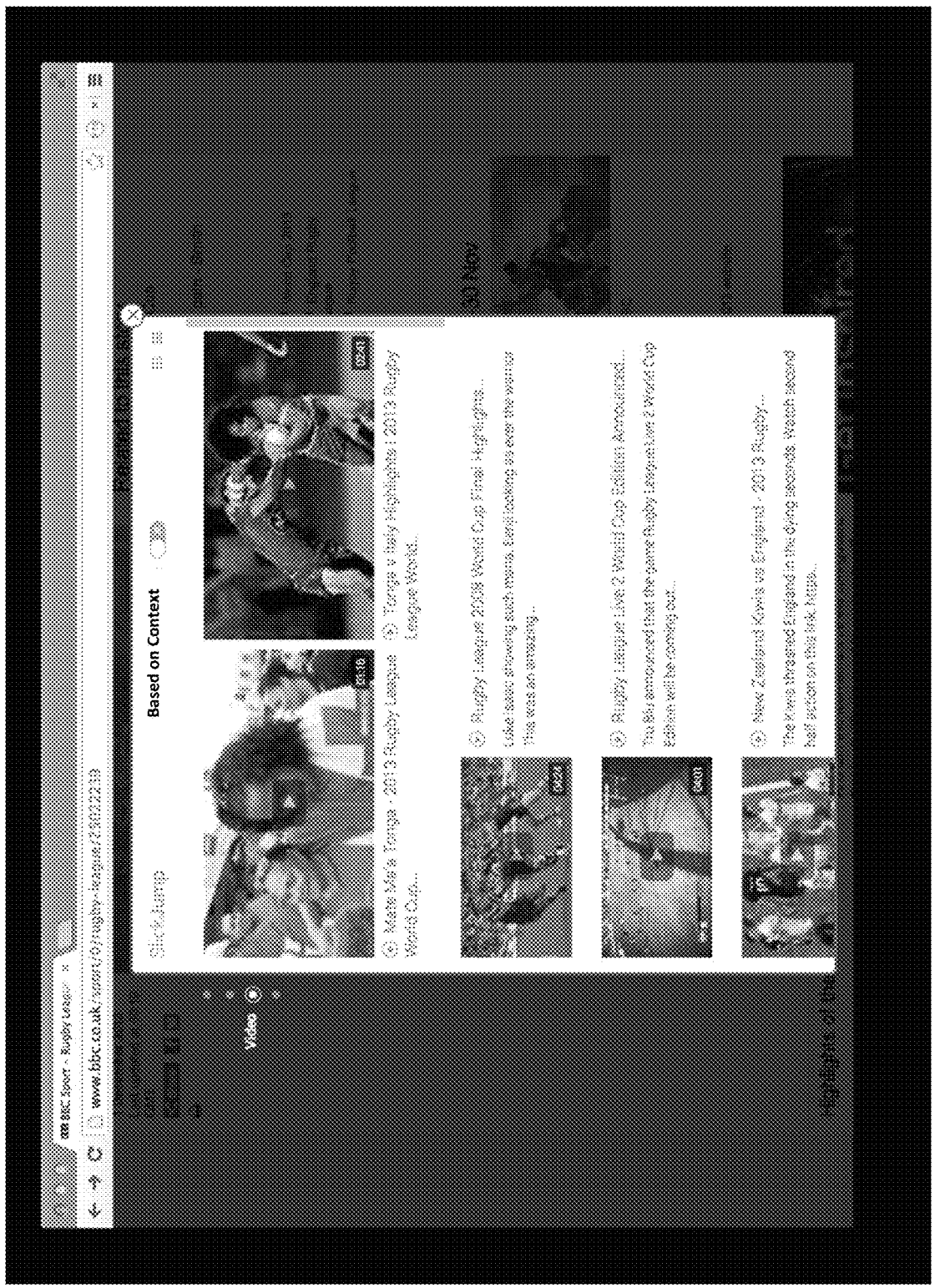

FIG. 19 illustrates results of the intent "video."

FIG. 20 illustrates another exemplary embodiment of the invention regarding the way it displays information for the user depending on how the user interacts with the content on their computing device.

In step 2010, the user interacts with content presented to them, e.g., text in a text document, image in a graphic processor, video clip in a video file, etc. Based on this interaction, in step 2020, zests are calculated. In step 2030, based on the selected zest, context surrounding the point of user-content interaction, collected information, etc. a query is generated. This query can be used either as an input for a search engine (e.g., a third party search engine, such as Google) or as a database query (e.g., SQL), containing information that can be found using such queries (or just zests) and displayed to the user. Note that the information to be found and displayed may be stored in any known format, such as text, video, image, etc. The information may be either an advertisement, or some source (e.g., an encyclopedia, a popular website, etc.), or it may also be combined, i.e., an ad to be displayed to the user may be merged with informative content. The advertising part of such mixed content may have some visible and invisible (for user and/or system) tags added to it, which, for instance, make it possible to distinguish an advertisement from informative (natural) content visually.

Step 2040 is optional: a query can be modified as described above, e.g., by adding context parts or collected info-data into it. Such a modification can help to change the search area, for instance, by specifying the query, or broadening it, or making it more relevant to the specific domain, etc. For example, if we add "computer" to "tablet", it will narrow the search to computing devices only, excluding medical goods. In step 2050, the query can be sent to a Search engine or a database, or it can be processed using other means available in order to find relevant information, that is search results 2060. Further on, in step 2070, search results 2060 are modified.

The modification of search results may consist of excluding and including types of modifications. Excluding modifications means removing elements from search results based on certain characteristics, e.g., such elements that do not correspond to categories selected by the user (or by the system, based on content element analysis, collected info-data, etc.), as well as geographic position, language, age, gender, and other parameters. Also, some elements found may be excluded, if they present links to banned or suspicious web-sites, or are found unsafe by antivirus software, and so on. Note that the elements found (as well as their reference locations, if there are some links to other web-sites) can be processed by antivirus software and checked against databases containing lists of allowed/recommended web-sites. In case some elements (both links to some external Internet-content and independent components, such as advertisements, documents, etc.) are found to be non-recommended, they won't be displayed to the user. Also, they can be excluded from the list of found elements and memorized in order not to show them again. For instance, such unrecommended elements, found as a result of an antivirus check, are added to a ban-list, since they provide links to unreliable sources or web-sites, which contain forbidden or harmful information, such as malicious codes, scripts, etc.

An including modification means adding information from different sources (such as local storages, web-based storages, ad servers, online encyclopedias, advertiser servers, etc.—all mentioned in the scope of the present invention) to the search results. Thus, search results will contain information from both the search engine and pre-selected sources for the given search category (which, for instance, may be contained within a database formed based on analysis of user(s) actions), as has been shown above. The method used to mix different sources of information to be displayed to the user is described above.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A method for identifying user goals in a website, the method comprising:
   receiving text, markup and element styles that form a displayable HTML page;
   using the markup and the element styles, identifying portions of the text that are displayable in multiple columns that represent a joint block of information;
   before displaying the HTML page to a user, using Natural Language Processing (NLP) to label words or expressions in the joint block of information with their syntactic and semantic categories, and caching results of the NLP for subsequent use;
   identifying thematic categories of the joint block of information;
   displaying the HTML page to the user;
   mapping a geometrical point of user interaction to a position in the text in the joint block of information without using a browser to calculate text position, except for using the browser to define geometrical boundaries of HTML elements that contain the joint block of information;
   wherein any point in the text in the joint block of information acts as a hyperlink to the user goals;
   using the cached results of the NLP for the joint block of information in an area near the position in the text to generate a plurality of syntactic trees; identifying zests in the syntactic trees based on the area, the syntactic and semantic categories and the thematic categories, and calculating weights of the zests, wherein the zests are words or expressions that represent suggested points of interest in the content;
   adjusting weights of the zests based on tags associated with the user that are provided by an external server;
   selecting zests with the highest weight and highest degree of belonging to the area;
   using the zests located near the geometrical point of user interaction to determine the user goals; and
   displaying the user goals, including replacing some elements of the HTML page; and
   displaying promoted information that is based on one user goal selected by the user, wherein some elements of the HTML page are replaced with icons and a preview of promoted content.

2. The method of claim 1, wherein the text is received separately from the markup and element styles.

3. The method of claim 1, wherein the parts of the text are linked logically and geometrically, where different portions of the same sentence or of the same word or the same paragraph are on separated parts of the displayed HTML page.

4. The method of claim 3, wherein the logical and geometric linkages include relationships between words, phrases, sentences, paragraphs, entire contents of the web-page, advertising, banners, 3D content, video, portions of words, portions of phrases, portions of sentences, portions of images, portions of video.

5. The method of claim 1, wherein only the zests near the geometrical point of user interaction are visible to the user and selectable by the user.

6. The method of claim 1, wherein the zests are used as a query to a search engine for generating search results.

7. The method of claim 6, wherein the search results based on the query are presented to user.

8. The method of claim 7, wherein the search results are modified as follows before the presentation to the user:
   the search results are modified to exclude results based on the preselected options for search: categories, black list of sites, the geographical position; and
   the search results are modified to include results from other search engines, advertisement services, the user's browsing history and items from other applications.

9. The method of claim 7, wherein the zests are derived from chains with the highest weights.

10. The method of claim 1, wherein the NLP of the text also includes analysis of any of the following elements:
    images;
    animation;
    game elements;
    advertisements; and
    3D models.

11. The method of claim 1, wherein the step of identifying zests also identifies the zests based on detection and analysis of eye movement by the user.

12. The method of claim 1, wherein attributes of the text include n-grams.

13. The method of claim 1, wherein the promoted information is selected based on a continuously updated association matrix that defines relations between objects in the HTML page and the user goals.

14. The method of claim 13, further comprising presenting, to the user, a set of pictograms representing the user goals generated based on the association matrix.

15. The method of claim 1, wherein the identifying portions of the text in the multiple columns is based, at least in part, on different colors on borders of neighboring image parts so as to determine whether the image parts are logically connected.

16. The method of claim 1, wherein the promoted information is targeted to the user based on information about a hardware device used by the user, and including battery level information of the hardware device.

17. The method of claim 1, wherein the zests are also identified based on their distance from the geometrical point of user interaction.

18. The method of claim 1, wherein the zests are also identified based on selection of a word by a user and using a sentence or paragraph in which the word is found for analysis.

19. A system for identifying user goals in a website, the system comprising a processor configured to perform the following steps:

receiving text, markup and element styles that form a displayable HTML page;

using the markup and the element styles, identifying portions of the text that are displayable in multiple columns that represent a joint block of information;

before displaying the HTML page to a user, using Natural Language Processing (NLP) to label words or expressions in the joint block of information with their syntactic and semantic categories, and caching results of the NLP for subsequent use;

identifying thematic categories of the joint block of information;

displaying the HTML page to the user;

mapping a geometrical point of user interaction to a position in the text in the joint block of information without using a browser to calculate text position, except for using the browser to define geometrical boundaries of HTML elements that contain the joint block of information;

wherein any point in the text in the joint block of information acts as a hyperlink to the user goals;

using the cached results of the NLP for the joint block of information in an area near the position in the text to generate a plurality of syntactic trees;

identifying zests in the syntactic trees based on the area, the syntactic and semantic categories and the thematic categories, and calculating weights of the zests, wherein the zests are words or expressions that represent suggested points of interest in the content;

adjusting weights of the zests based on tags associated with the user that are provided by an external server;

selecting zests with the highest weight and highest degree of belonging to the area;

using the zests located near the geometrical point of user interaction to determine the user goals;

displaying the user goals, including replacing some elements of the HTML page; and displaying promoted information that is based on one user goal selected by the user, wherein some elements of the HTML page are replaced with icons and a preview of promoted content.

* * * * *